(12) United States Patent
Landers et al.

(10) Patent No.: US 7,472,044 B2
(45) Date of Patent: Dec. 30, 2008

(54) HORIZONTALLY STRUCTURED CAD/CAM MODELING-VERTICAL TO HORIZONTAL CONVERSION

(75) Inventors: Diane M. Landers, Frankenmuth, MI (US); Kevin H. Marseilles, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 527 days.

(21) Appl. No.: 10/805,925

(22) Filed: Mar. 22, 2004

(65) Prior Publication Data

US 2005/0209834 A1    Sep. 22, 2005

(51) Int. Cl.
G06F 17/10 (2006.01)

(52) U.S. Cl. .................. 703/2; 703/6; 700/98; 700/182; 717/104

(58) Field of Classification Search ............ 703/6, 703/7; 345/672; 700/98, 182; 717/104
See application file for complete search history.

(56) References Cited

U.S. PATENT DOCUMENTS

| | | | |
|---|---|---|---|
| 4,555,771 A | 11/1985 | Hayashi | |
| 4,680,705 A | 7/1987 | Shu | |
| 5,184,426 A | 2/1993 | Minatani | 451/5 |
| 5,301,318 A * | 4/1994 | Mittal | 716/11 |
| 5,351,196 A | 9/1994 | Sowar et al. | 700/182 |
| 5,467,293 A | 11/1995 | Summer et al. | 703/2 |
| 5,691,909 A | 11/1997 | Frey et al. | 700/159 |
| 5,710,709 A | 1/1998 | Oliver et al. | 700/184 |
| 5,768,136 A | 6/1998 | Fujiwara et al. | 700/182 |
| 5,793,647 A | 8/1998 | Hageniers et al. | 702/35 |
| 5,808,432 A | 9/1998 | Inoue et al. | 318/561 |
| 5,815,154 A | 9/1998 | Hirschtick et al. | 715/853 |
| 5,819,062 A | 10/1998 | Srikantappa | |
| 6,073,056 A | 6/2000 | Gawronski et al. | 700/98 |
| 6,120,171 A | 9/2000 | Shaikh | 700/98 |
| 6,219,049 B1 | 4/2001 | Zuffante et al. | 715/764 |
| 6,219,055 B1 | 4/2001 | Bhargava et al. | 715/850 |
| 6,263,252 B1 | 7/2001 | St. Ville | 700/98 |
| 6,323,863 B1 | 11/2001 | Shinagawa et al. | 345/441 |
| 6,341,153 B1 | 1/2002 | Rivera et al. | 378/4 |
| 6,341,996 B1 | 1/2002 | Brien et al. | 451/8 |
| 6,599,125 B1 | 7/2003 | Freilich et al. | 433/212.1 |
| 6,629,065 B1 | 9/2003 | Gadh et al. | 703/1 |

(Continued)

FOREIGN PATENT DOCUMENTS

EP    1241550    9/2002

OTHER PUBLICATIONS

Tang, M. et al. "Parametric Modeling with User-Defined Features." The 6th Int'l Conf. on Computer Supported Cooperative Work in Design. Jul. 2001. pp. 207-211.*

(Continued)

Primary Examiner—Kandasamy Thangavelu
(74) Attorney, Agent, or Firm—Thomas N. Twomey

(57) ABSTRACT

A method for converting a vertically structured CAD/CAM model to a horizontally structured CAD/CAM model, comprising: identifying and establishing a base feature; establishing a parent coordinate system; identifying a parent modeling element; identifying each dependency for each feature from the parent modeling element; restructuring each dependency for each feature for placement, such that each feature exhibits a direct associative relationship with a reference feature; and restructuring each dependency for each feature for positioning, such that each feature exhibits a direct associative relationship with another reference feature.

28 Claims, 35 Drawing Sheets

U.S. PATENT DOCUMENTS

| | | | | |
|---|---|---|---|---|
| 6,735,489 | B1 | 5/2004 | Khurana et al. | 700/95 |
| 6,754,556 | B1* | 6/2004 | Landers et al. | 700/182 |
| 2002/0133252 | A1 | 9/2002 | Landers et al. | 700/97 |
| 2002/0133253 | A1* | 9/2002 | Landers et al. | 700/98 |
| 2002/0133265 | A1 | 9/2002 | Landers et al. | 700/182 |
| 2002/0133266 | A1* | 9/2002 | Landers et al. | 700/182 |
| 2002/0133267 | A1 | 9/2002 | Landers et al. | 700/182 |
| 2002/0133803 | A1* | 9/2002 | Landers et al. | 717/104 |
| 2002/0152000 | A1* | 10/2002 | Landers et al. | 700/98 |
| 2003/0004596 | A1* | 1/2003 | Landers et al. | 700/98 |
| 2003/0114945 | A1 | 6/2003 | Hirano et al. | 700/97 |
| 2003/0133265 | A1 | 7/2003 | Kinsey et al. | 361/687 |
| 2003/0144758 | A1 | 7/2003 | Duggirala et al. | |
| 2003/0204284 | A1 | 10/2003 | Thomas et al. | 700/175 |
| 2003/0204285 | A1* | 10/2003 | Thomas et al. | 700/182 |
| 2003/0204286 | A1 | 10/2003 | Thomas et al. | 700/182 |
| 2004/0148145 | A1* | 7/2004 | Chen et al. | 703/2 |
| 2004/0153186 | A1* | 8/2004 | Khurana | 700/98 |
| 2004/0153200 | A1 | 8/2004 | Landers et al. | |
| 2004/0153201 | A1 | 8/2004 | Landers et al. | |
| 2004/0153202 | A1* | 8/2004 | Landers et al. | 700/182 |
| 2004/0153296 | A1* | 8/2004 | Landers et al. | 703/2 |
| 2004/0153824 | A1* | 8/2004 | Devarajan et al. | 714/38 |

OTHER PUBLICATIONS

Agbodan, D. et al. "A Topological Entity Matching Technique for Geometric Parametric Models." Shape Modeling Int'l 2003. May 12-15, 2003. pp. 235-244.*

Han, JungHyun and Aristides Requicha. "Feature Recognition from CAD Models." IEEE Computer Graphics and Applications. Mar./Apr. 1998, pp. 80-94.*

Han, Jung Hyun et al. "Manufacturing Feature Recognition Toward Integration with Process Planning." IEEE Transactions on Systems, Man, and Cybernetics. Jun. 2001. vol. 31, No. 3, pp. 373-380.*

P. Drew and R. King, "The Performance and Utility of the Cactis Implementation Algorithms." Proc. of the 16th VLDB Conf. 1990. pp. 135-147.*

PR Newswire. "Delphi Redefines CAD/CAM Design for Manufacturers." Sep. 29, 2003.*

PR Newswire. "Delphi and Cadpo Announce Training Program for Delphi's Breakthrough CAD/CAM Methodologies." Sep. 29, 2003.*

Anonymous. "Delphi Slashes Design Cycle, Establishes Center of Excellence." Tooling & Production, Nov. 2003. pp. 6 and 8.*

Anonymous. "Redefining CAD/CAM." American Machinist. Nov. 2003. p. 40.*

Ralph Templin. "Structured Design Methodologies Link Design and Manufacturing." CATIA Community. Published Mar. 30, 2004. Printed Sep. 9, 2007 from Google's cache.*

Steve Reinisch, "Horizontal Modeling", Created on Aug. 10, 2007 . http://www.gatago.org/comp/cad/solidworks/56067806.html. Printed Sep. 9, 2007.*

Getting Started with Solid Edge Version 15.

Chih-Hsing Chu and Chun-Fong You, "Operation Planning in NC Programming Based on CAD Systems," Technology-oriented NC Tool Path General Based on CAD System; pp. 1-25.

Sridhar S. Condoor, "Integrating Design in Engineering Graphics Courses Using Feature based, Parametric Solid Modeling," 29th ASEE/IEEE Frontiers in Education Conference 12d-13; 1999.

William H. Beyer, Ph.D., editor; CRC Handbook of Mathematical Sciences, 5th Edition, 1978; pp. 354-355.

What's New in Unigraphics V18.05.2 User Guide; 2002.

Solid Edge User's Guide Version 6, MU28900-ENG, by Unigraphics Solutions, 1998, pp. 28,29,33,90,91,96, 157, and 178.

Artificial Intelligence (Understanding Computers Series), Time-Life Books, 1986, ISNBN-0-8094-5675-3, pp. 36-43.

Mok et al., "Automatic Generation of Assembly Instructions Using STEP", IEEE, pp. 313-324.

Ganesan et al., "Flexi-CAD: An Architecture for Integrated Product Modeling and Manufacture by Features", 1994 IEEE, pp. 60-65.

U.S. Appl. No. 09/483,722, filed Jan. 14, 2000, Khurana et al.
U.S. Appl. No. 10/355,326, filed Jan. 31, 2003, Khurana et al.
U.S. Appl. No. 10/355,355, filed Jan. 31, 2003, Landers et al.
U.S. Appl. No. 10/355,662, filed Jan. 31, 2003, Landers et al.
U.S. Appl. No. 10/355,749, filed Jan. 31, 2003, Landers et al.
U.S. Appl. No. 10/355,763, filed Jan. 31, 2003, Landers et al.

* cited by examiner

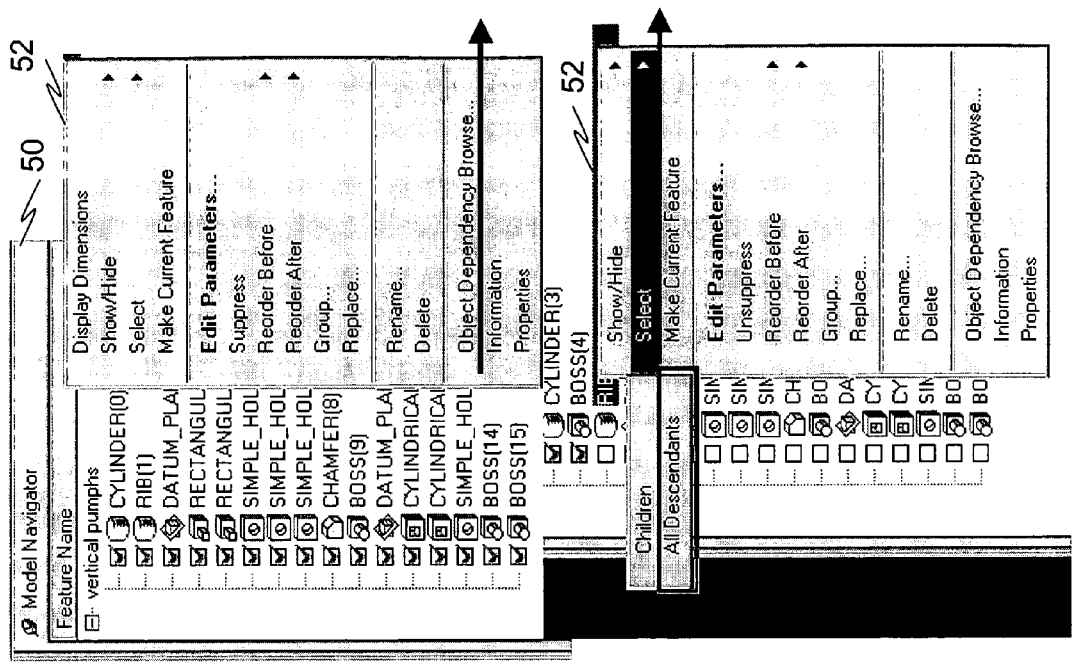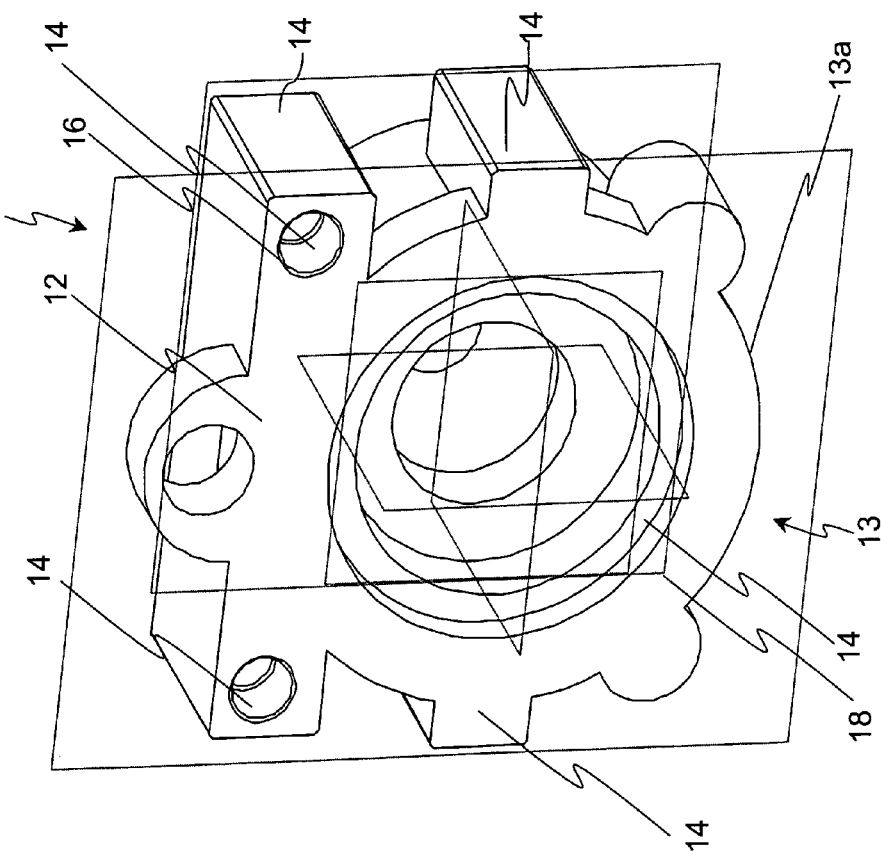
Identifying Dependencies *FIG. 1*
The Model Navigator Object Dependency Browser and Select All Descendents

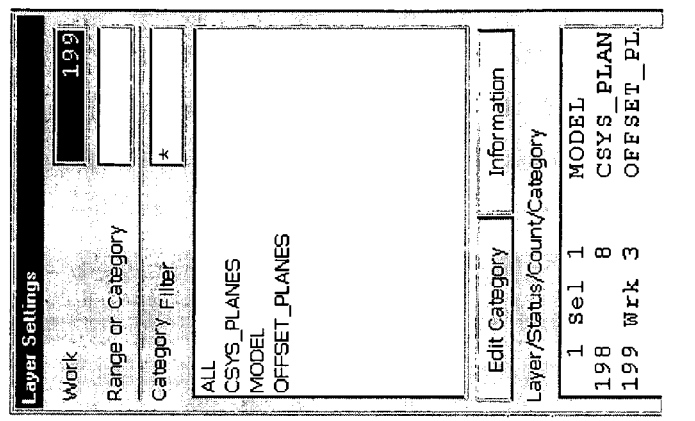
Create 0, offset datum planes of each CSYS plane to give value to the established coordinate system. These new planes are used for placement and positioning.
Move the three new planes below the CSYS
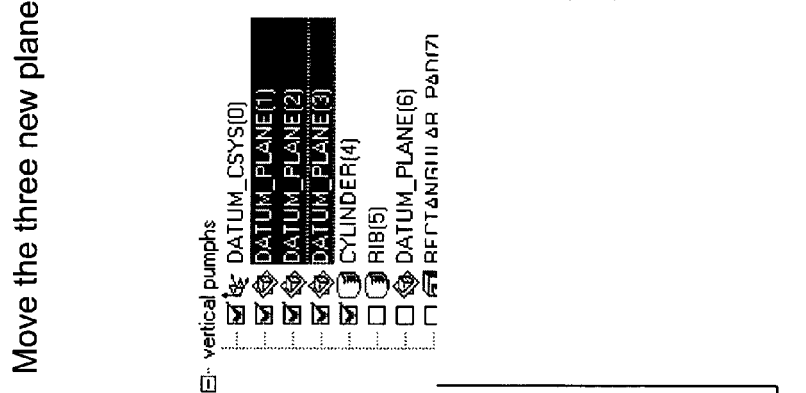
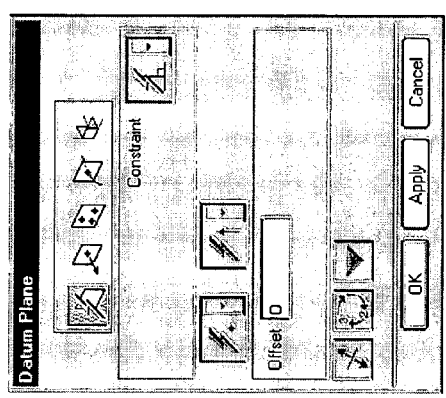
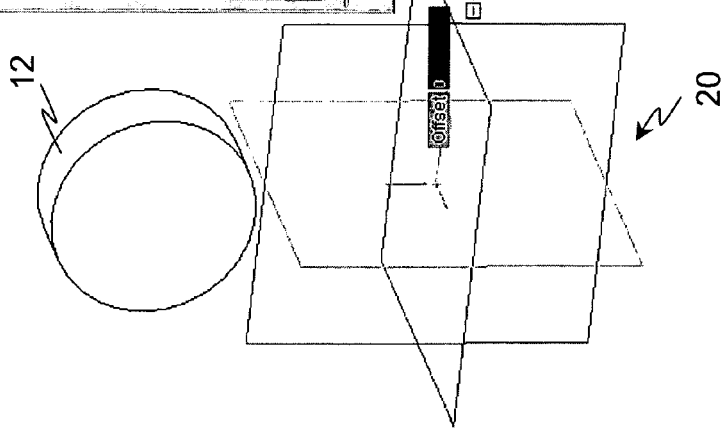
FIG. 4

Parent/Child Relationship

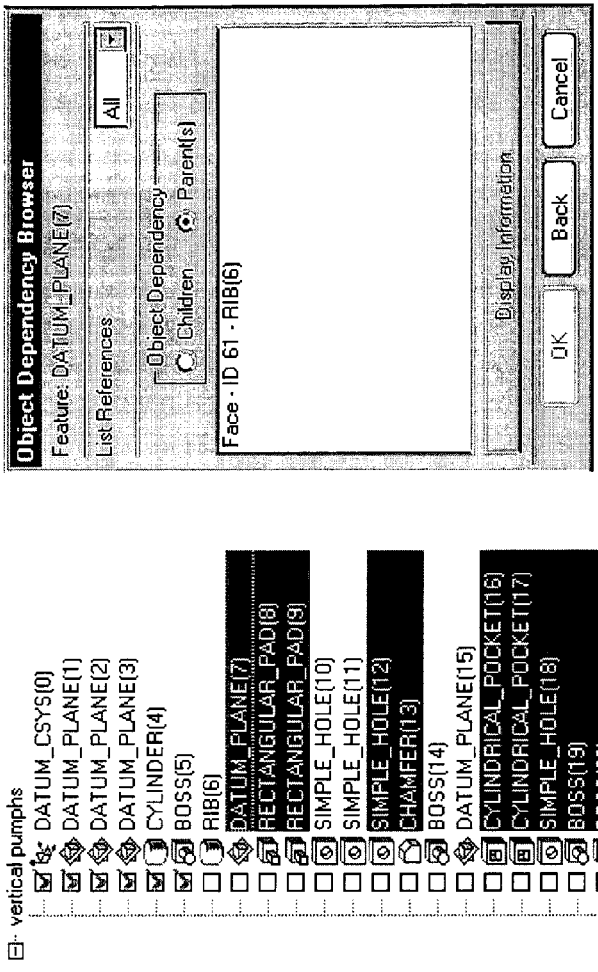

Select ALL Descendents

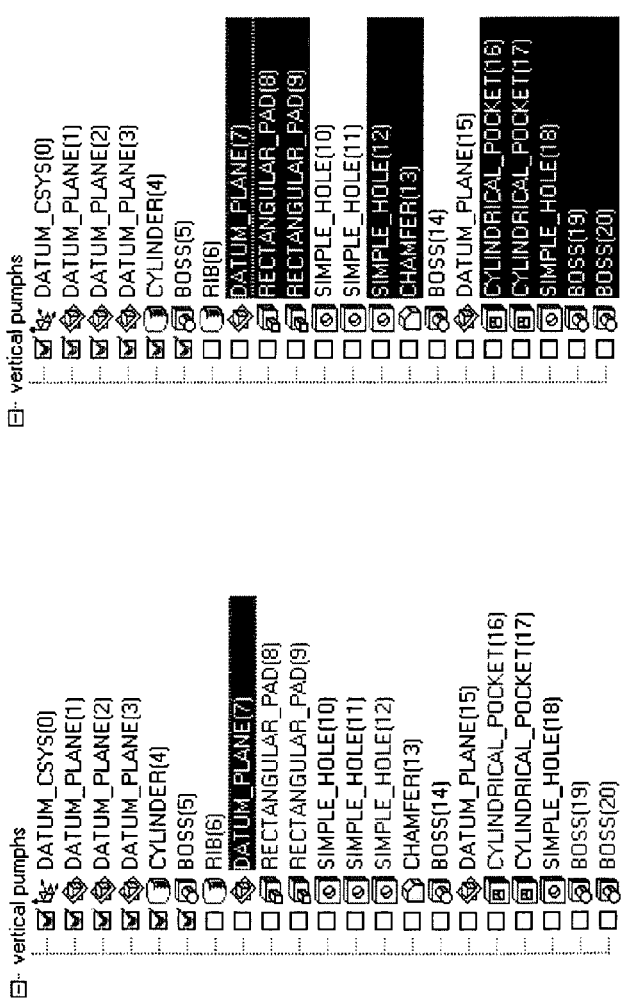

OBSERVATION:
Datum Plane (7) has the parent of a FACE. The RIB is the parent (pink) and the children (blue) are highlighted.

CONCLUSION:
This datum was used for placement or positioning of the blue features.

LEGACY FEATURES ARE NOT DELETED UNTIL DEPENDENCIES ARE REMOVED

NOTE:

Parent/Child dependencies and the Positioning dependencies have to be checked.

*FIG. 7*

Note: Datum Plane (7) was created at a 0 offset from the face of the RIB face. An easy solution for converting this datum is to reattach Datum Plane (7) to Datum Plane (2) and offset it relative to the height of the NEW boss (5) which is 10mm Create an expression to make the offset of datum plane (7) = to the height of Boss (5)

Create an expression to make the height of cylinder (3) = the height of Boss (4)

NOTE:
This keeps the plane relative to the cylinder face if the cylinder height changes.

Expressions:

p10=10 (cylinder (4) height)

p11=Positioning Dimension Offset value of Datum (7)

p137 Height of Boss (5)

Datum & Boss
Expression: p11=p10

Cylinder & Boss
Expression: p137=p10

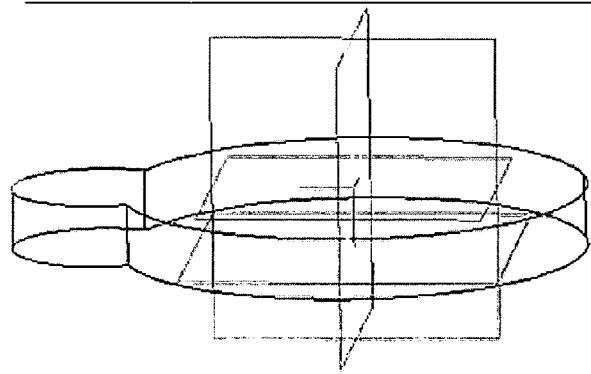

Datum Offset 10mm from the XY plane

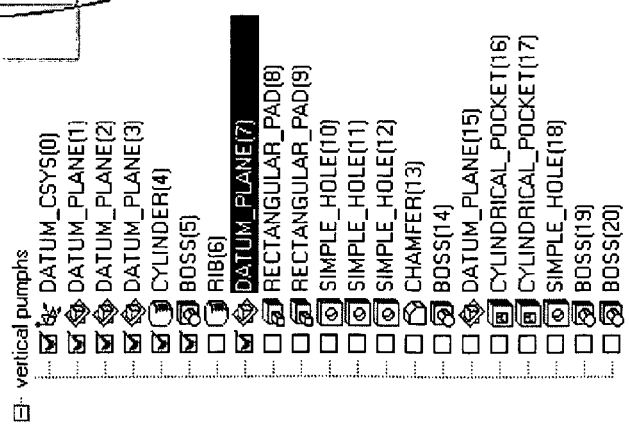

FIG. 9

Rectangular Pad (8 & 9)

OBSERVATION:
Datum Plane (7) is the Parent of Rectangular Pad (8 & 9).

Edge – RIB (6) and Datum Plane (7) are used for placement and positioning the Rectangular Pad. The Body is the Pad attaching to the solid.

ACTION:
Un-suppress Rectangular Pad (8) – There are parent child dependency problems that won't allow this to be performed.

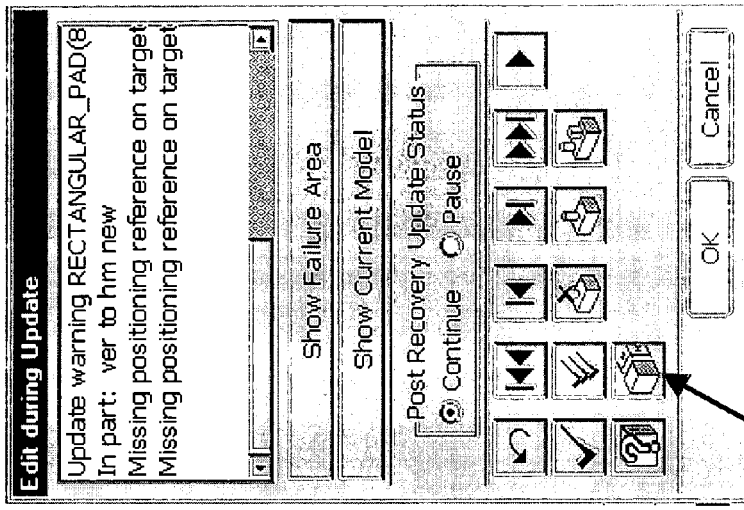

The Rectangular Pad needs to be re-attached – Edit Rectangular Pad (8) -Reattach

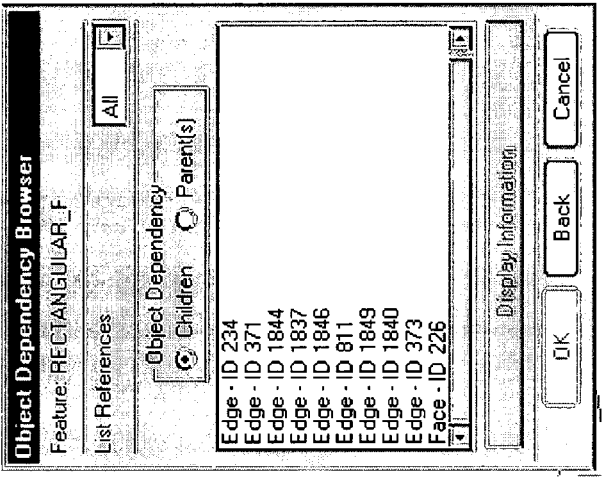

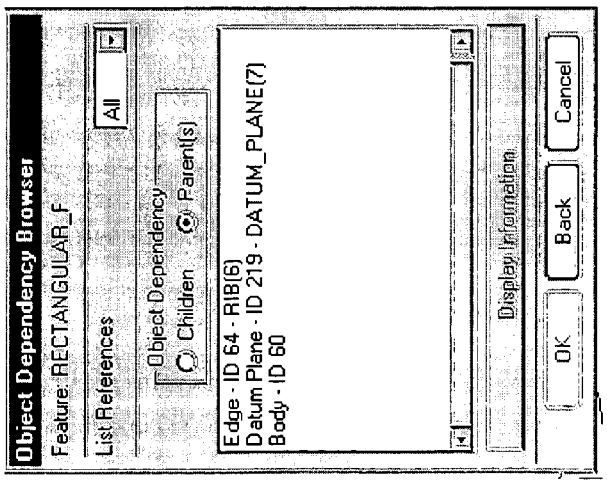

FIG. 10

Create New Positioning Dimensions Perpendicular to the Offset
Datums (1 & 3) referenced above
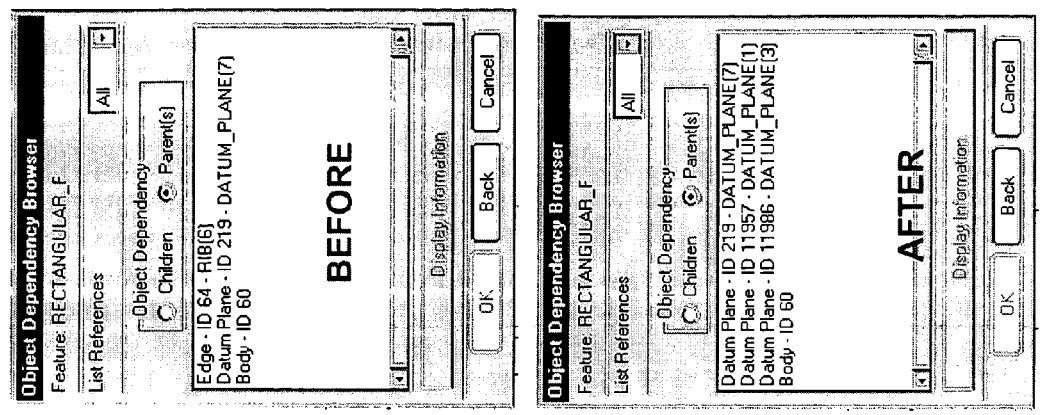
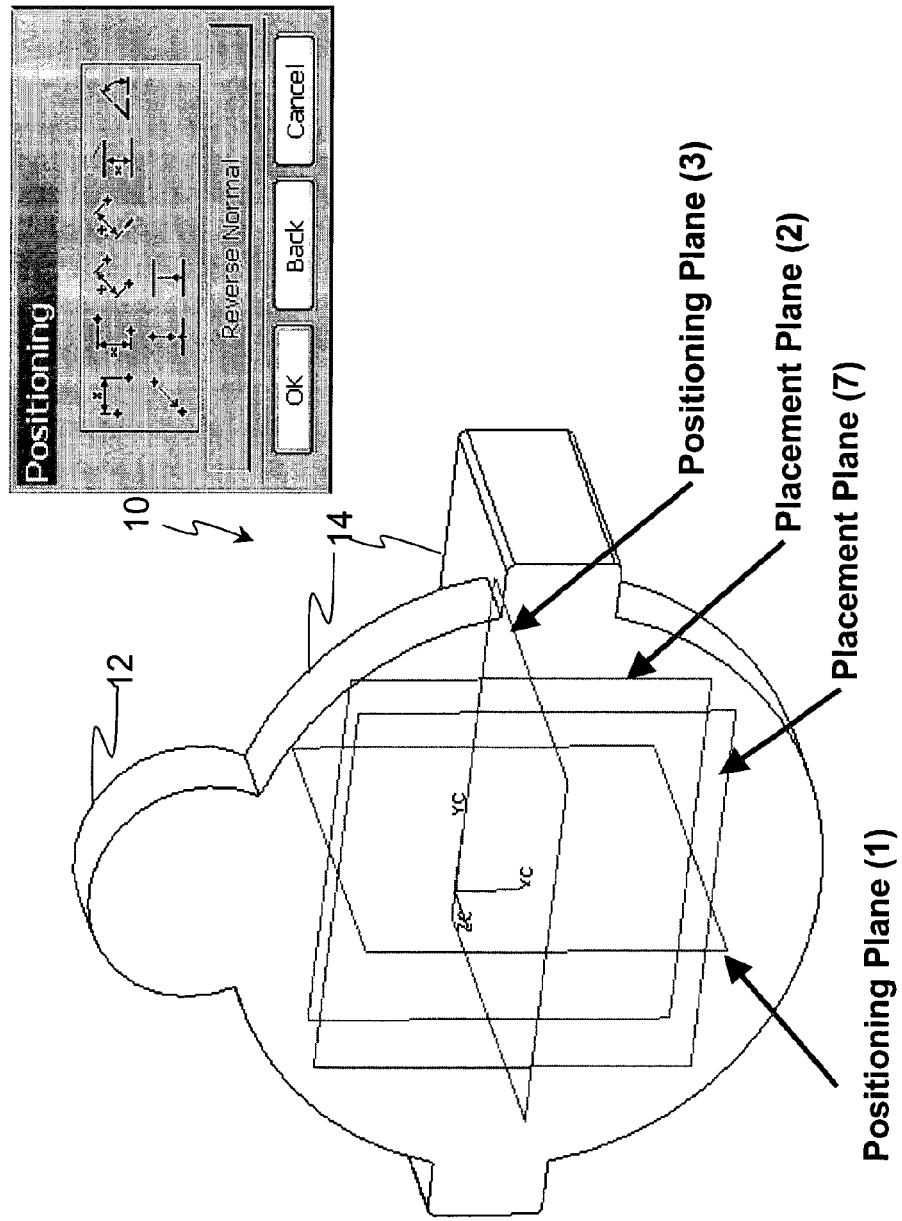
FIG. 12

Reattach and Reposition Simple Holes
Old Positioning Dimensions for Simple Hole (10)
Referenced to edges
Simple Hole (10) is Dependent on Cylinder (4)
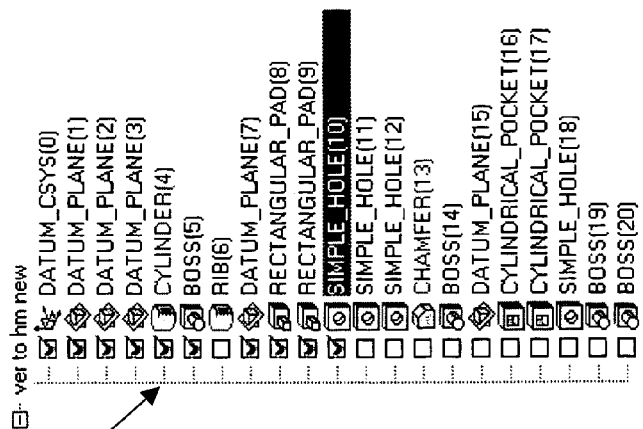
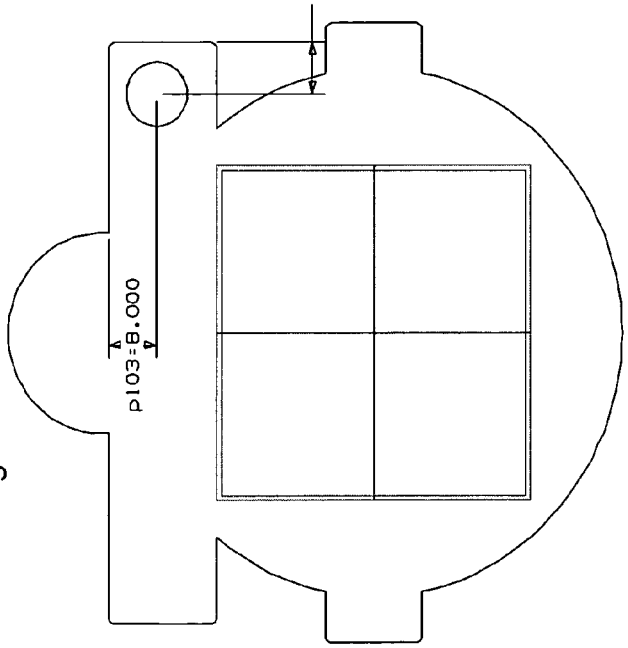
Un-suppress the Simple Hole (10) - Edit Parameters
Reattach to the New Datum Plane (3) for placement. Specify the origin as 0,0, 0
Delete ALL OLD Positioning Dimensions
*FIG. 14*

Old Positioning Dimensions for Simple Hole (11)
Referenced to edges
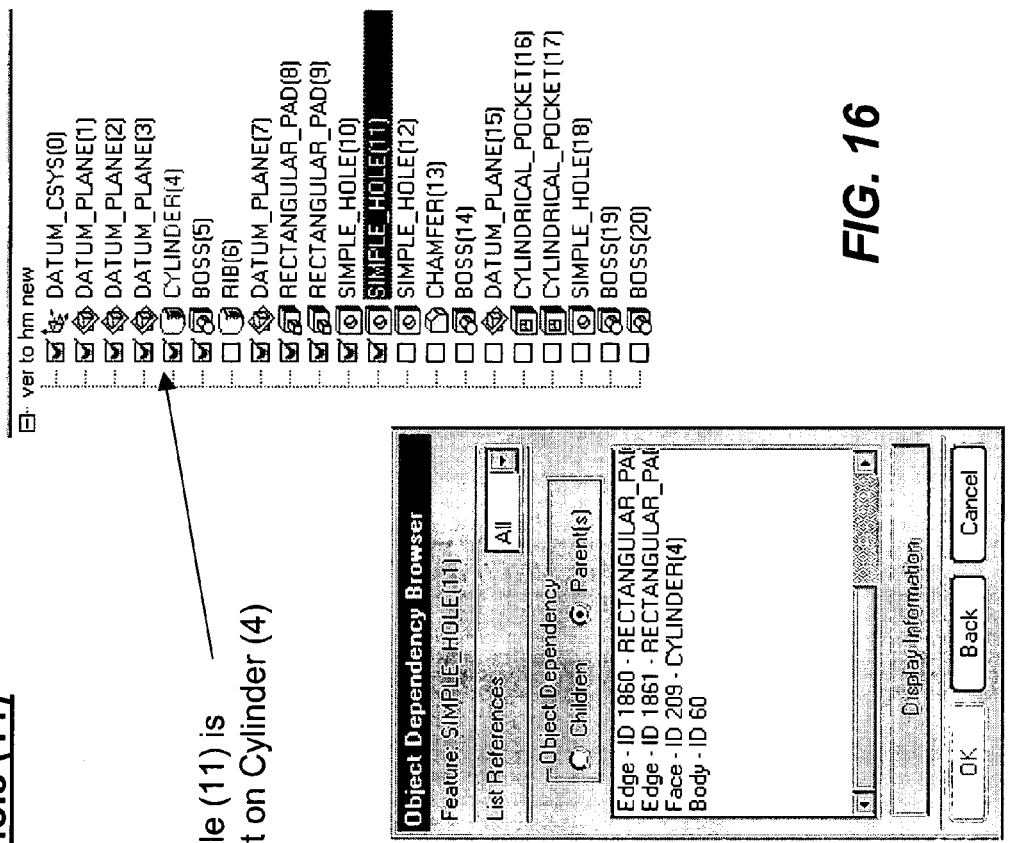
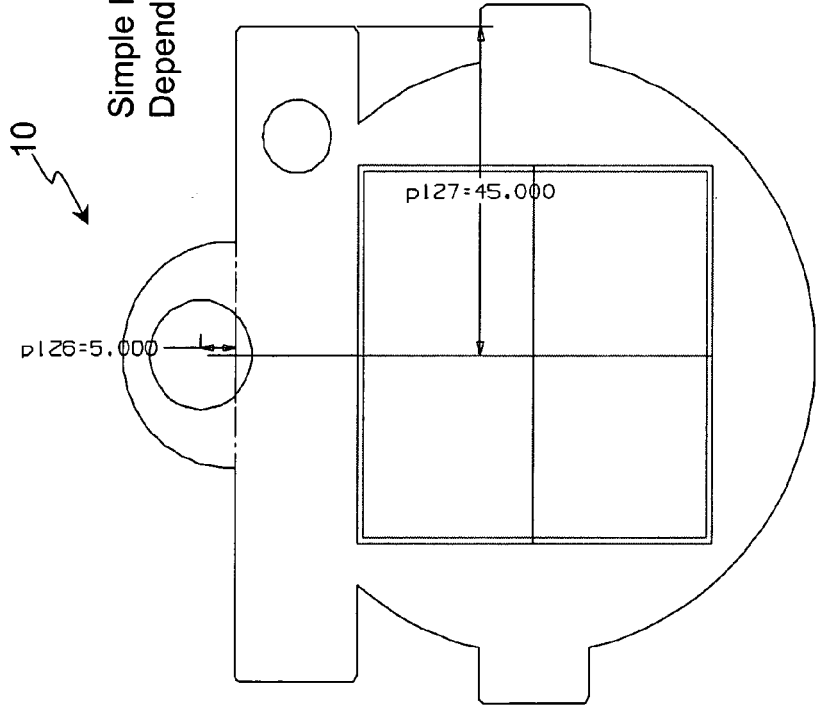
FIG. 16

Best Practice: Reorder Chamfers and Blends to the end of the list

Note: If chamfers are tied on existing edges, they wont have problems being reordered. If the chamfer was placed on an edge that no longer exists, the location will have to be redefined.

Un-Suppress Datum (14)
Delete
Before
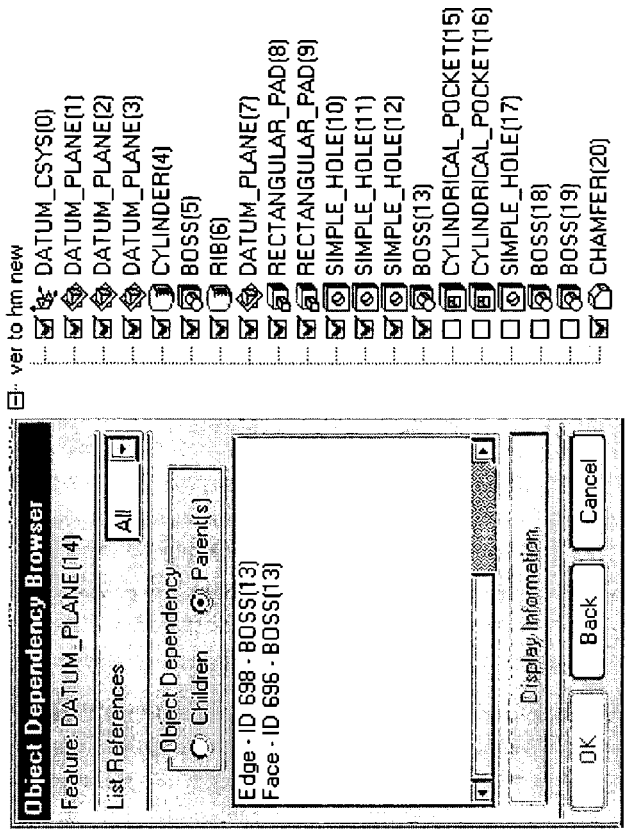
This feature is ONLY dependent on Boss (13) and has no children – it can be deleted
After
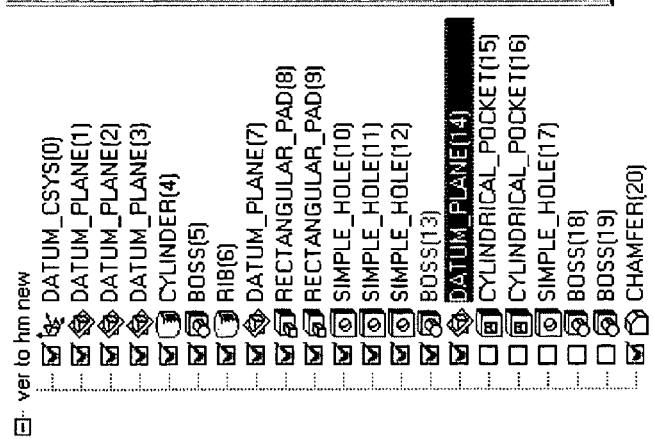
*FIG. 21*

Un-Suppress Cylindrical Pocket (15)
Reposition
Before
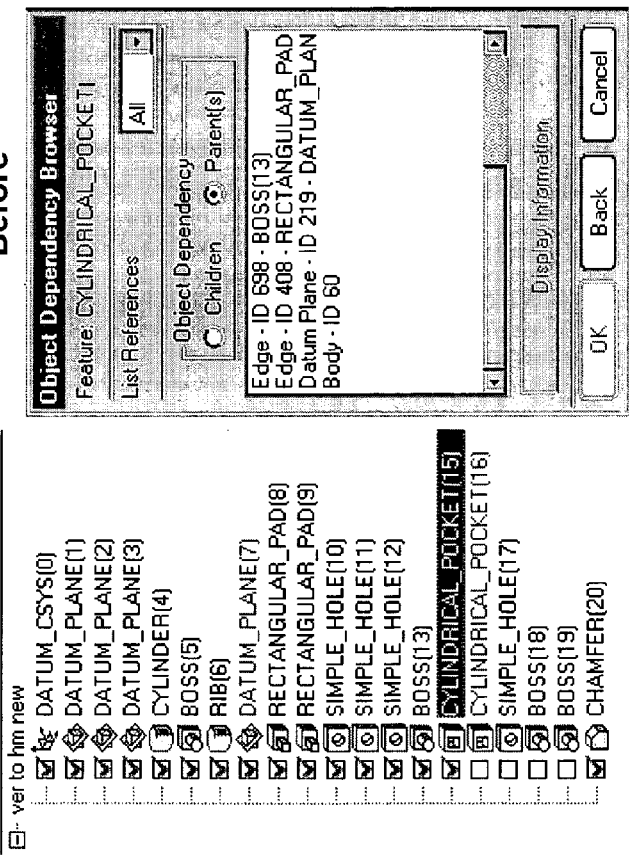
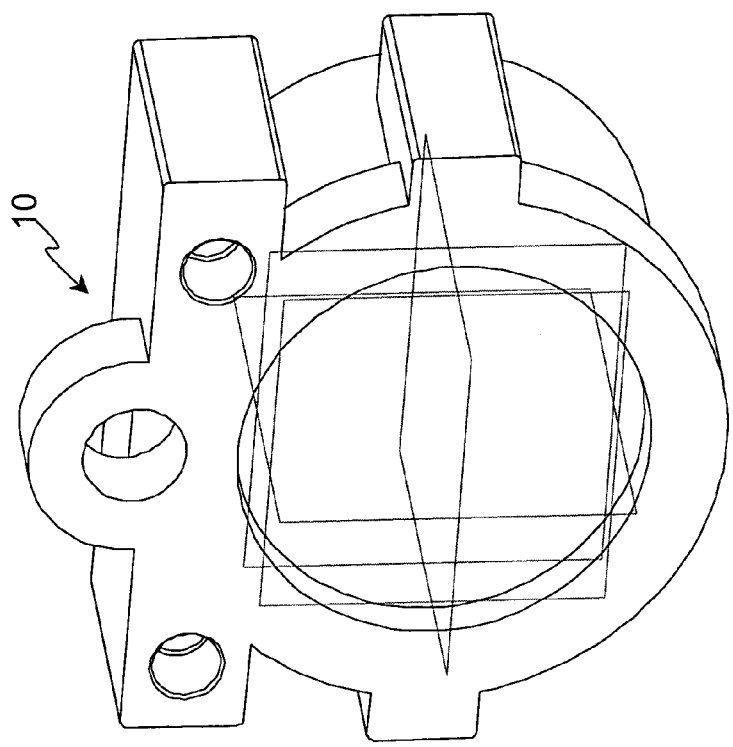
FIG. 22
This feature is already on Datum (7) for its placement, but it has Cylindrical Pocket (16) as a child. Delete the old positioning dimensions and create new ones that are referenced to datums (1 & 3)

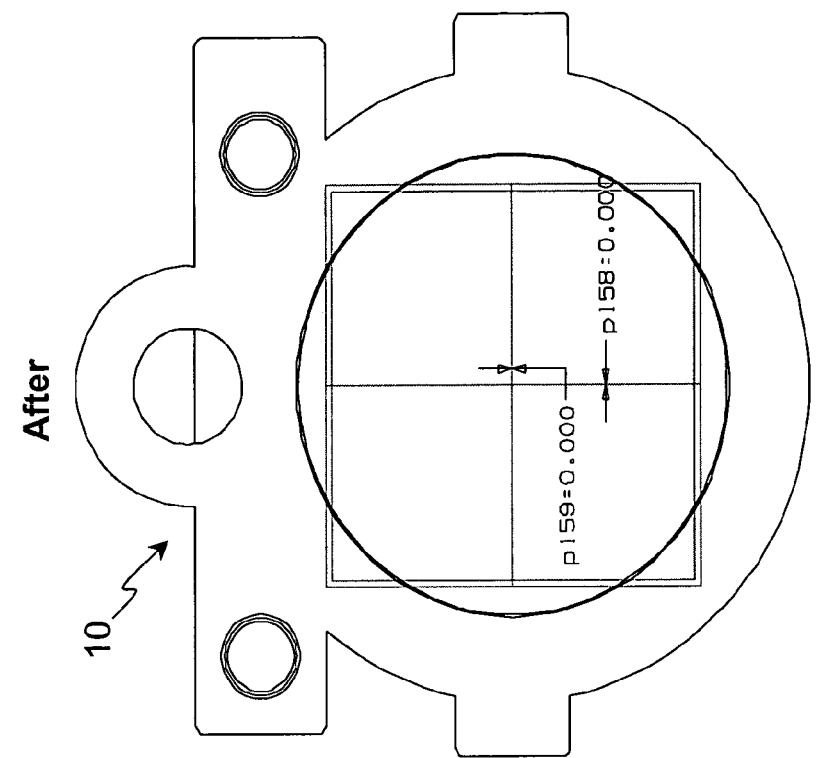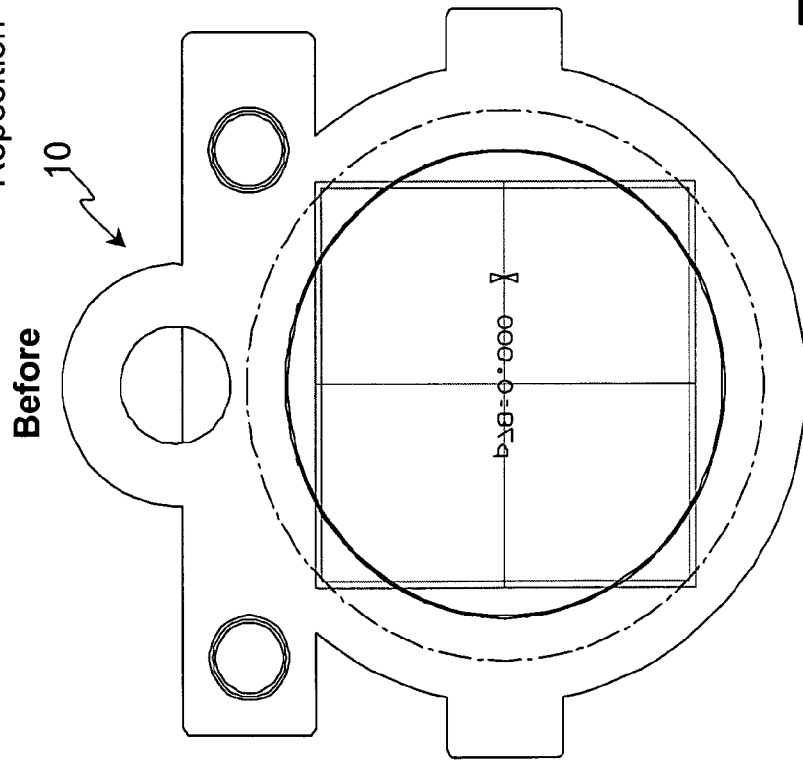
FIG. 23

Cylindrical Pocket (16)
Reattach & Reposition
The distance between the face and the starting point of this feature is 5mm. This has to be compensated for when repositioning this feature on datum (7)
An alternate solution would be to offset a new plane relative to the starting point and use the new plane for placement.
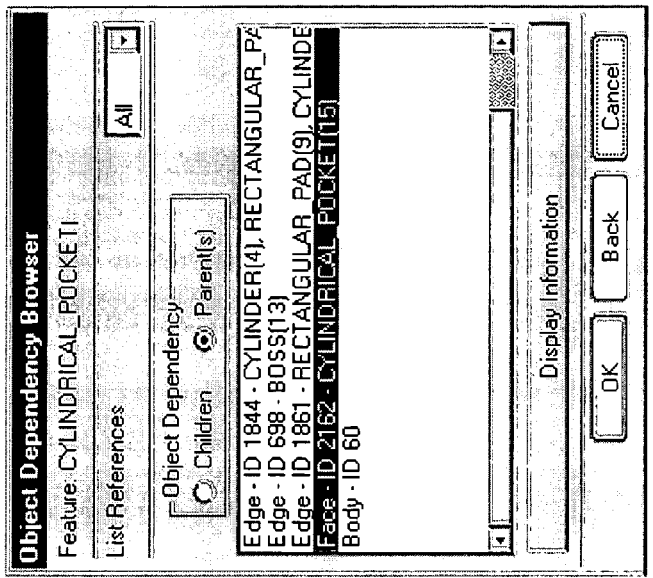
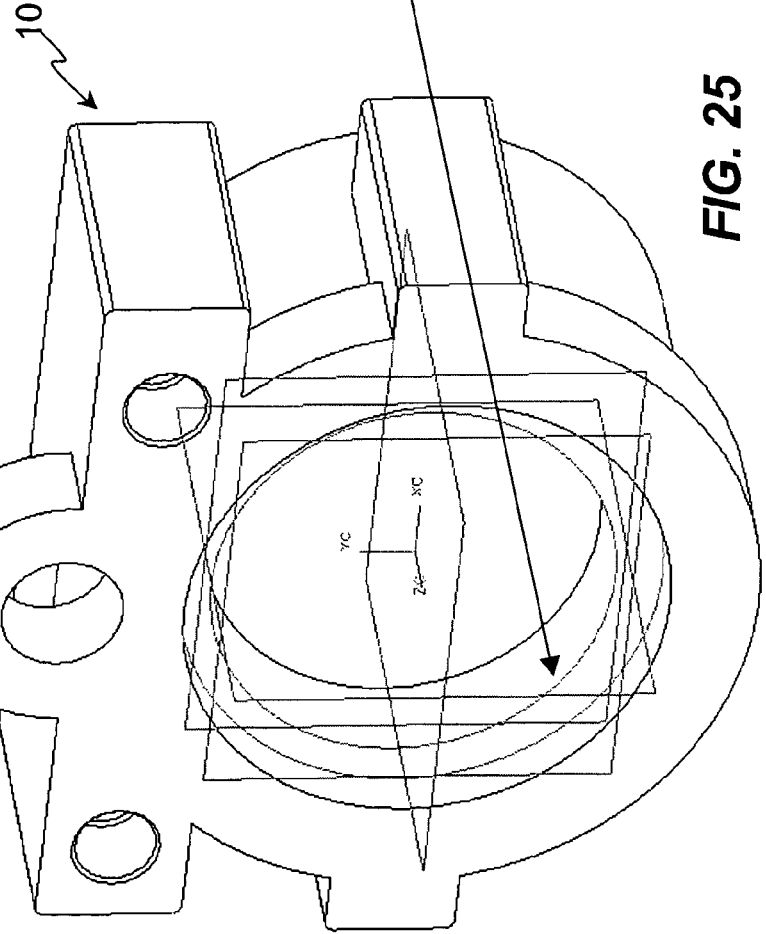
FIG. 25

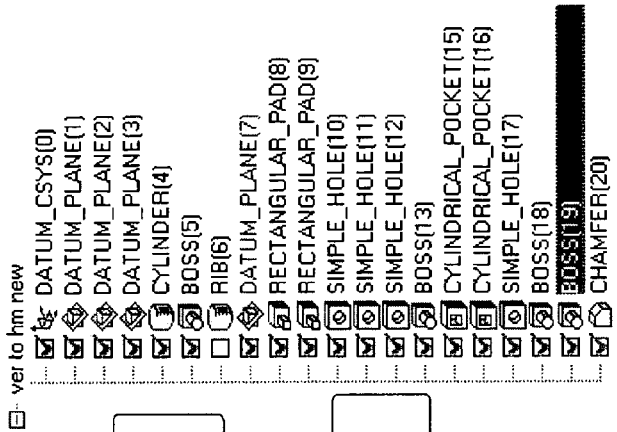
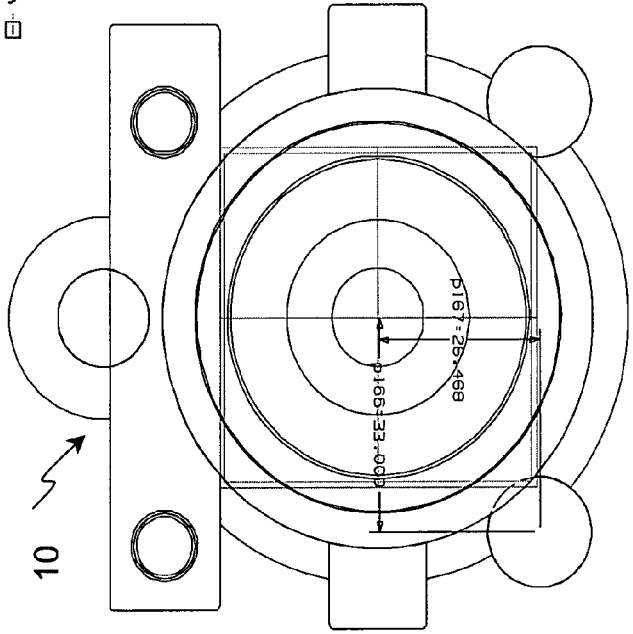
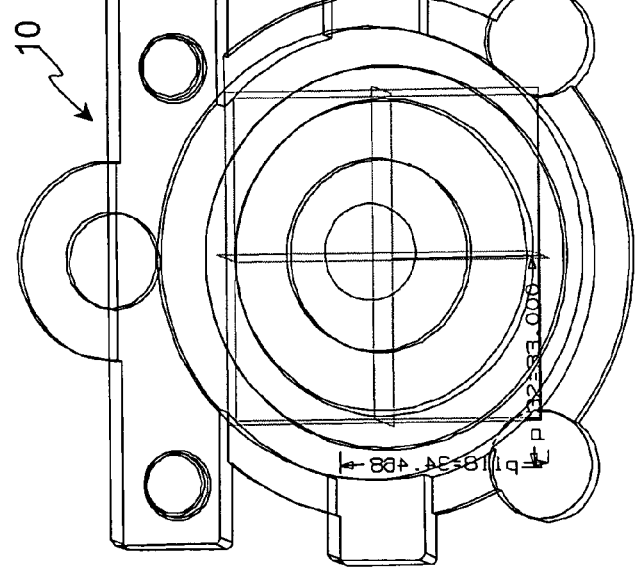
FIG. 32

RIB (6)
Delete

Datum Plane (7)
Reorder (Best Practice)

⊟ ver to hm new
- DATUM_CSYS(0)
- DATUM_PLANE(1)
- DATUM_PLANE(2)
- DATUM_PLANE(3)
- DATUM_PLANE(4)
- CYLINDER(5)
- BOSS(6)
- RECTANGULAR_PAD(7)
- RECTANGULAR_PAD(8)
- SIMPLE_HOLE(9)
- SIMPLE_HOLE(10)
- SIMPLE_HOLE(11)
- BOSS(12)
- CYLINDRICAL_POCKET(13)
- CYLINDRICAL_POCKET(14)
- SIMPLE_HOLE(15)
- BOSS(16)
- BOSS(17)
- CHAMFER(18)

Now that all features have been converted from the vertical structure to Horizontal Modeling, the RIB feature can be deleted. Originally, most of the features were placed on and positioned to the RIB, now they are all independent of each other.

⊟ ver to hm new
- DATUM_CSYS(0)
- DATUM_PLANE(1)
- DATUM_PLANE(2)
- DATUM_PLANE(3)
- CYLINDER(4)
- BOSS(5)
- DATUM_PLANE(6)
- RECTANGULAR_PAD(7)
- RECTANGULAR_PAD(8)
- SIMPLE_HOLE(9)
- SIMPLE_HOLE(10)
- SIMPLE_HOLE(11)
- BOSS(12)
- CYLINDRICAL_POCKET(13)
- CYLINDRICAL_POCKET(14)
- SIMPLE_HOLE(15)
- BOSS(16)
- BOSS(17)
- CHAMFER(18)

⊟ ver to hm new
- DATUM_CSYS(0)
- DATUM_PLANE(1)
- DATUM_PLANE(2)
- DATUM_PLANE(3)
- CYLINDER(4)
- BOSS(5)
- RIB(6)
- DATUM_PLANE(7)
- RECTANGULAR_PAD(8)
- RECTANGULAR_PAD(9)
- SIMPLE_HOLE(10)
- SIMPLE_HOLE(11)
- SIMPLE_HOLE(12)
- BOSS(13)
- CYLINDRICAL_POCKET(15)
- CYLINDRICAL_POCKET(16)
- SIMPLE_HOLE(17)
- BOSS(18)
- BOSS(19)
- CHAMFER(20)

Delete

*FIG. 33*

Ensure All Features have been Converted

To make sure that each feature is Horizontally Structured.

Parent/Child dependencies and the Positioning dependencies have to be checked.

Reveal faces and edges that have dependencies with the selected features.

The ideal Object Dependency Browser reading should read:

Final Feature List

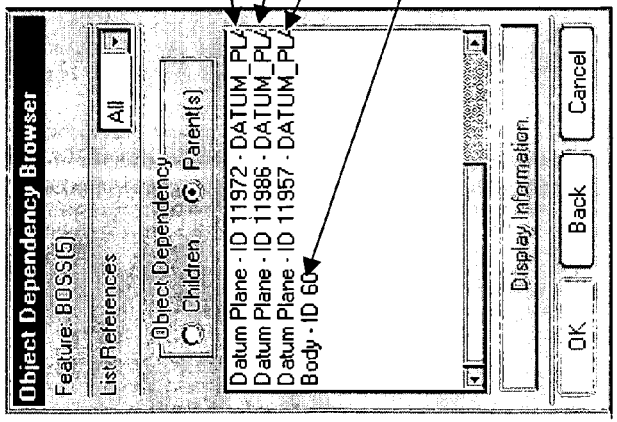

- Placement
- Positioning
- Positioning
- Feature becoming part of the Solid Model

*FIG. 34*

HORIZONTALLY STRUCTURED CAD/CAM MODELING-VERTICAL TO HORIZONTAL CONVERSION

BACKGROUND

This disclosure relates to Computer-Aided Design and Computer-Aided Manufacturing (CAD/CAM) methods. CAD/CAM software systems are long known in the computer art. Some utilize wire-and-frame methods of building models while others utilize form features. Typically, in the form feature method of building CAD/CAM models, physical features are added to the model in an associative relationship with whatever other features. Unfortunately, then, the alteration or deletion of any one feature will result in the alteration or deletion of any other features attached to it. This makes altering or correcting complicated models extensive and time-consuming.

Over time, many three dimensional models (3D) have been generated employing "vertical" techniques. To significantly realize the advantages of horizontally structured modeling techniques, these models would need to be recreated employing horizontally structured modeling. Unfortunately, recreating existing models can be expensive and may not be cost effective. Therefore, what is needed in the art is a method for converting vertically structured models to horizontally structured models.

BRIEF SUMMARY

Disclosed herein in an exemplary embodiment is a method for converting a vertically structured CAD/CAM model to a horizontally structured CAD/CAM model, comprising: identifying and establishing a base feature; establishing a parent coordinate system; identifying a parent modeling element; identifying each dependency for each feature from the parent modeling element; restructuring each dependency for each feature for placement, such that each feature exhibits a direct associative relationship with a reference feature; and restructuring each dependency for each feature for positioning, such that each feature exhibits a direct associative relationship with another reference feature.

Also disclosed herein in another exemplary embodiment is a horizontally structured CAD/CAM model, comprising: a reference feature; a base feature; and a feature. The CAD/CAM model is converted from a vertically structured CAD/CAM model by restructuring each dependency for each feature for placement, such that each feature exhibits a direct associative relationship with the reference feature, and restructuring each dependency for each feature for positioning, such that each feature exhibits a direct associative relationship with another reference feature.

Also disclosed in yet another exemplary embodiment is a storage medium encoded with a machine-readable computer program code. The storage medium including instructions for causing a computer to implement the abovementioned method for converting a vertically structured CAD/CAM model to a horizontally structured CAD/CAM model.

Additionally disclosed herein in yet another embodiment is a computer data signal. The computer data signal comprising code configured to cause a processor to implement the abovementioned method for converting a vertically structured CAD/CAM model to a horizontally structured CAD/CAM model.

BRIEF DESCRIPTION OF THE DRAWINGS

FIG. 1 is a diagram of an existing model with feature dependencies depicted;

FIG. 4 is an illustration of the conversion methodology applied to the vertical model of FIG. 1 showing generation of a parent coordinate system;

FIG. 7 is an illustration of the conversion methodology applied to the vertical model of FIG. 1 showing observation of feature dependencies;

FIG. 9 is an illustration of the conversion methodology applied to the vertical model of FIG. 1 showing re-attachment of an existing datum plane for feature placement;

FIG. 10 is an illustration of the conversion methodology applied to the vertical model of FIG. 1 showing feature dependencies of a feature;

FIG. 12 is an illustration of the conversion methodology applied to the vertical model of FIG. 1 showing positioning of additional features, e.g. RECTANGULAR_PAD(8);

FIG. 14 depicts the placement and existing positioning of a modeling feature e.g., SIMPLE_HOLE(10);

FIG. 16 depicts the feature dependency and repositioning of a modeling feature e.g., SIMPLE_HOLE(11);

FIG. 21 depicts the evaluation and deletion of unused features once the feature dependencies have been restructured;

FIG. 22 depicts the feature dependencies of a modeling feature, e.g., CYLINDRICAL_POCKET(15);

FIG. 23 depicts the repositioning of a modeling feature, e.g., CYLINDRICAL_POCKET(15);

FIG. 25 depicts the placement of a modeling feature, e.g., CYLINDRICAL_POCKET(16);

FIG. 32 depicts the repositioning of a modeling feature, e.g., BOSS(19);

FIG. 33 depicts the deletion of unused features once the feature dependencies have been restructured; and FIG. 34 depicts a final check of the feature dependencies of the restructured model to ensure the horizontal structure of the feature dependencies.

DETAILED DESCRIPTION

Figure 2A:
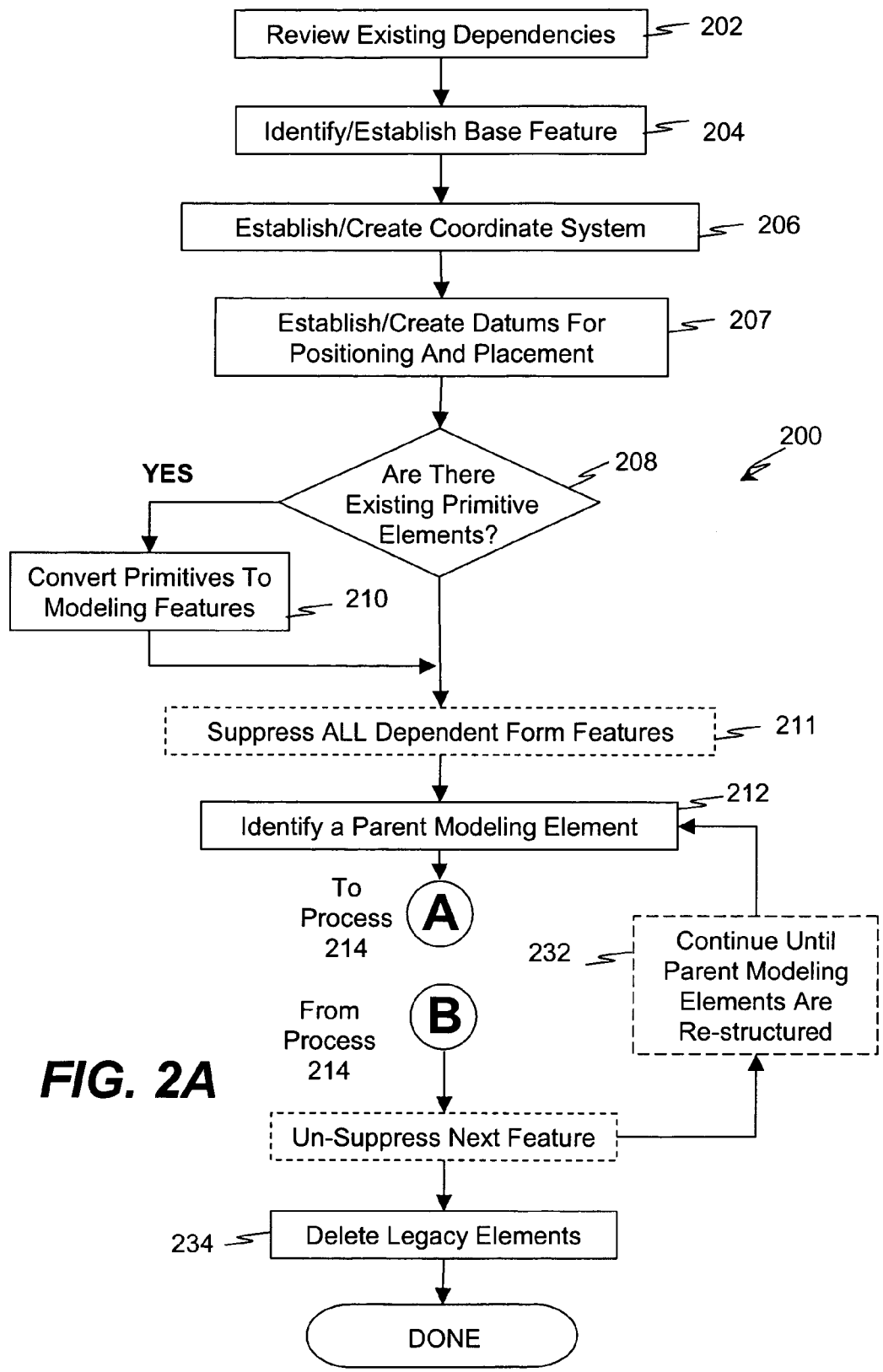
FIG. 2A is a flowchart depicting a methodology in accordance with an exemplary embodiment of the invention.

Disclosed herein is a horizontal method of computer-aided design and computer aided manufacture (CAD/CAM) modeling that exhibits significant advantages over modeling techniques employing vertical methods. Many existing three dimensional models (3D), referred to herein as legacy data, have been generated employing "vertical" techniques. To significantly realize the advantages of horizontally structured modeling techniques, these models would need to be recreated employing horizontally structured modeling. The disclosed embodiments permit conversion of a "vertical" model to a horizontally structured model such that any one feature is substantially independent of the remaining features. Advantageously, such an approach ensures that the model is configured so that alterations, additions, and deletions of individual features (e.g., holes, bosses, etc.) may be accomplished without impacting a significant portion of the model.

The methodologies of the exemplary embodiments may be implemented on any CAD/CAM software package that supports (a) reference planes or their Cartesian equivalents, (b) parametric modeling or its equivalent, and (c) feature modeling or its equivalents. Throughout this specification, examples and terminology will refer to Unigraphics® software for illustrative purposes, but the method is not limited to that particular modeling software package. Other suitable CAD/CAM software packages that meet the three criteria above and that would therefore be suitable. For example, other suitable software packages include, but may not be limited to, SOLID EDGE®, also by Unigraphics®, and CATIA® by IBM®. Note that the phrases "datum planes", "parametric modeling" and "features" are phrases derived from the Unigraphics® documentation and may not necessarily be used in other software packages. Therefore, their functional definitions are set out below.

"Horizontal modeling" is a methodology employed to add features to a model, preferably by establishing an exclusive associative relationships, in particular, parent/child relationships between a set of reference planes and each feature. The reference planes themselves may, but need not be, children of a parent base feature from which a horizontally structured model is developed. Since each added feature of the model is related exclusively to a reference coordinate, then individual features may be added, edited, suppressed or deleted individually without affecting the rest of the model.

"Model" refers to the part that is being created via the CAD/CAM software. The model comprises a plurality of modeling elements including "features".

It should be noted that the term "modeling elements" or elements of model and similar phraseology have been used throughout this specification. Such terminology is intended to include, but not be limited to: a reference, a reference axis, a reference datum, a datum, a coordinate system, a reference set, a geometry, a linked geometry, a linked body, a virtual blank, a base feature, a product model, a master process model, a master product and process concurrent model, an extract, an in-process model, an extracted body, a modeling feature, modifying feature, a manufacturing feature, a process sheet, a drawing, a product drawing, a tool drawing, a fixture, a spreadsheet and the like as well as combinations of the foregoing.

"Datum planes" refer to reference features that define Cartesian coordinates by which other features may be referenced to in space. In Unigraphics®, the datum planes are two-dimensional, but a plurality of datum planes may be added to a drawing to establish three-dimensional coordinates. These coordinates may be constructed relative to the model to move and rotate with the model. Regardless of how the coordinate system is created, for the purposes of this disclosure it should be possible to reference numerous features to the same coordinate system.

"Parametric modeling capabilities" refers to the ability to place mathematical constraints or parameters on features of the model so that the features may be edited and changed later. Models that do not have this capability i.e., models that include non-editable features, are referred to as "dumb solids". Most CAD/CAM systems support parametric modeling.

"Primitive" refers to Primitive features that are basic analytic shapes e.g., blocks, cylinders, cones and spheres. Primitives are nonassociative, meaning they are not associated to the geometry used to create them and are created in the model at the basic level. However, certain parameters may be edited. A primitive feature is usually the base feature of a model.

"Features" refers to parts and details that combine to form the model. A "reference feature", such as a coordinate system, datum, line, and the like is an imaginary feature that is treated and manipulated like a physical feature, but does not appear in the final physical model. A modeling feature, also denoted a form feature corresponds to the building blocks of a model, e.g., pads, bosses, holes, bores, and the like, as well as combinations including at least one of the foregoing. Modifying features are features directed to modification of a particular aspect of a feature. For example, blends, chamfers, and the like.

"Feature modeling" is the ability to build up a model by adding and connecting a plurality of editable features. Not all CAD/CAM software supports this capability. AutoCAD®, for example, currently employs a wire-frame-and-skin methodology to build models rather than feature modeling.

"Associative relationship" An aspect of feature modeling is the creation of associative relationships among models, model elements, features, and the like, as well as combinations of the foregoing, meaning the features are linked such that changes to one feature may alter the others with which it is associated. A particular exemplary associative relationship is a "parent/child relationship".

"Parent/child relationship" is a type of associative relationship among models, model elements, features, and the like, as well as combinations of the foregoing. For example, a parent/child relationship between a first feature (parent) and a second feature (child) means that changes to the parent feature will affect the child feature (and any children of the child all the way down the familial line), but changes to the child will have no effect on the parent. Further, deletion of the parent results in deletion of all the children and progeny below it. The foregoing definition is intended to address associative relationships created as part of generating a model, notwithstanding associative relationships created because of the application of expression driven constraints applied to feature parameters.

The present invention relates to the design and manufacture of a real-world object based upon a virtual CAD/CAM model. More particularly the methodologies for converting 3D models generated using "vertical" modeling techniques to horizontally structured 3D models. It will be appreciated that horizontal modeling ensures that a 3D model is configured so that features are substantially independent of the base feature and other features. Thereby, alterations, additions, and deletions of individual features (e.g., holes, bosses, etc.) may be accomplished without impacting a significant portion of the model. Horizontal modeling accomplishes such independence by configuring the 3D model such that added features are positioned and placed relative to independent coordinate system(s) (e.g., one or more datums) Conversely, vertically constructed models, are constructed with numerous features exhibiting relationships with the base feature of the model.

Figure 2B:
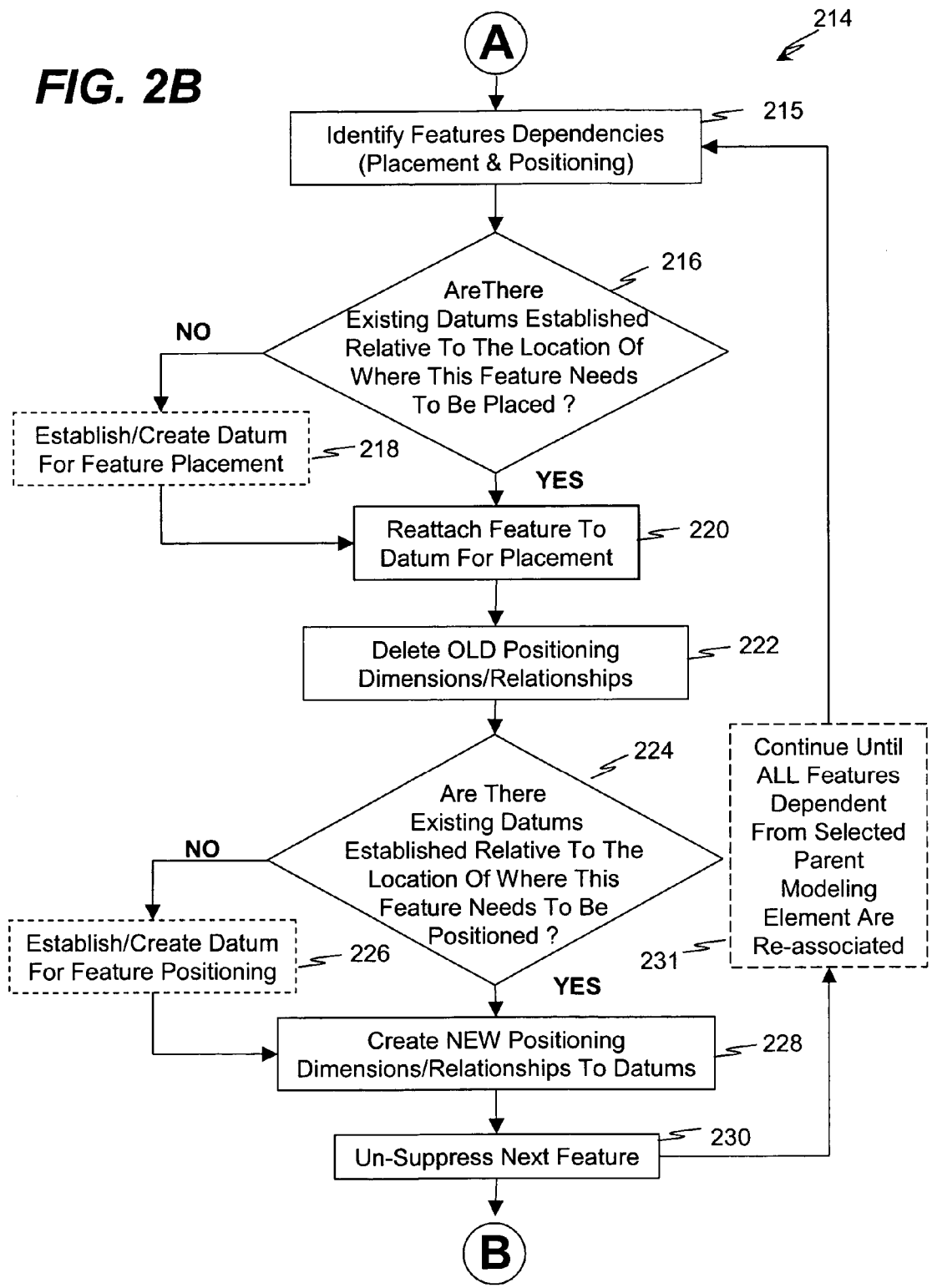
FIG. 2B is a flowchart depicting a methodology in accordance with an exemplary embodiment of the invention.

Referring now to FIG. 1, an existing 3D model 10 is depicted such as may have been created using "vertical" modeling techniques. Referring also to FIGS. 2A and 2B, a flowchart depicting the conversion methodology 200 of an exemplary embodiment is depicted. The 3D model 10 includes a base feature 12 (shown as cylinder(0)) with various modeling form features 14 e.g., holes, bores, pads, bosses, and the like added thereto. Some modeling features 14 may also include modifying features 16 such as blends, chamfers, and the like as well.

In order to appreciate the advantages and features of the exemplary embodiments an understanding of some basic guidelines, and beneficial practices of horizontally structured modeling is in order. For example, the order in which modeling features 14 are created is highly instructive as to being able to manipulate selected features 14. Knowing how features 14 interact e.g., feature dependencies, facilitates understanding as to where they are located on the feature tree of the existing 3D model 10 and how they should be arranged in the converted horizontally structured model 100. It is preferred, though not necessary that features 14 be reordered based on their feature dependencies. For example, in an exemplary embodiment, reference datum planes/axes 18 should preferably be the placed at the highest level e.g., first, because they are utilized later to establish a basic coordinate system and for creating additional parameterized coordinate systems/datum planes/axes 20 used for the placement and positioning of features 14. The base feature 12 is the base modeling element such as a linked body, cylinder, extruded sketch geometry, and the like that a model is "built" up from. Sketches (not shown) and modeling elements derived therefrom should preferably be second, as they are attached to reference planes 18. Modeling form features 14 used for creating the structure of the part being modeled follow, once again, because they are placed and positioned relative to the abovementioned coordinate systems 20 datum planes/axes 18. For example, modeling form features 14 include, but are not limited to extrusions, bosses, holes, pads, and the like, as well as combinations including at least one of the foregoing. Finally, modifying features 16 such as blends and chamfers are usually the finishing features on a modeled part. It is preferred to have these modifying features 16 last because when you need to modify modeling features 14, these modifying features 16 can exhibit dependency issues with the modeling features 14 that being edited. In other words, these types of modifying features 16 e.g., blends and chamfers are configured to be dependent on a physical geometry of another modeling feature 14.

Continuing with FIG. 1, the invention disclosed herein will be described by way of illustration employing an example utilizing Unigraphics®. It will be appreciated, as mentioned earlier that other modeling software would be equally applicable. Unigraphics® is a menu based CAD/CAM modeling environment. Within the Unigraphics® modeling environment are various toolbars/environments to facilitate model selection, generation, evaluation, and navigation of the various features, modeling elements and the like of a 3D model 10. For instance, Unigraphics® includes as a toolbar a menu-based model navigator 50 denoted as the Unigraphics® Model Navigator 50 to facilitate navigation and evaluation of the 3D model 10. Furthermore, the navigator 50 includes various facilities, processes, selection criteria, and the like referred to as functions 52 shown in the menus and sub-menus of the menu based navigator 50. As used herein, the various functions 52 shown in the menus and sub-menus of the menu based navigator 50 tool bar, will be referred to in capital letters. One such function 52 is the Object Dependency Browser.

Figure 3:
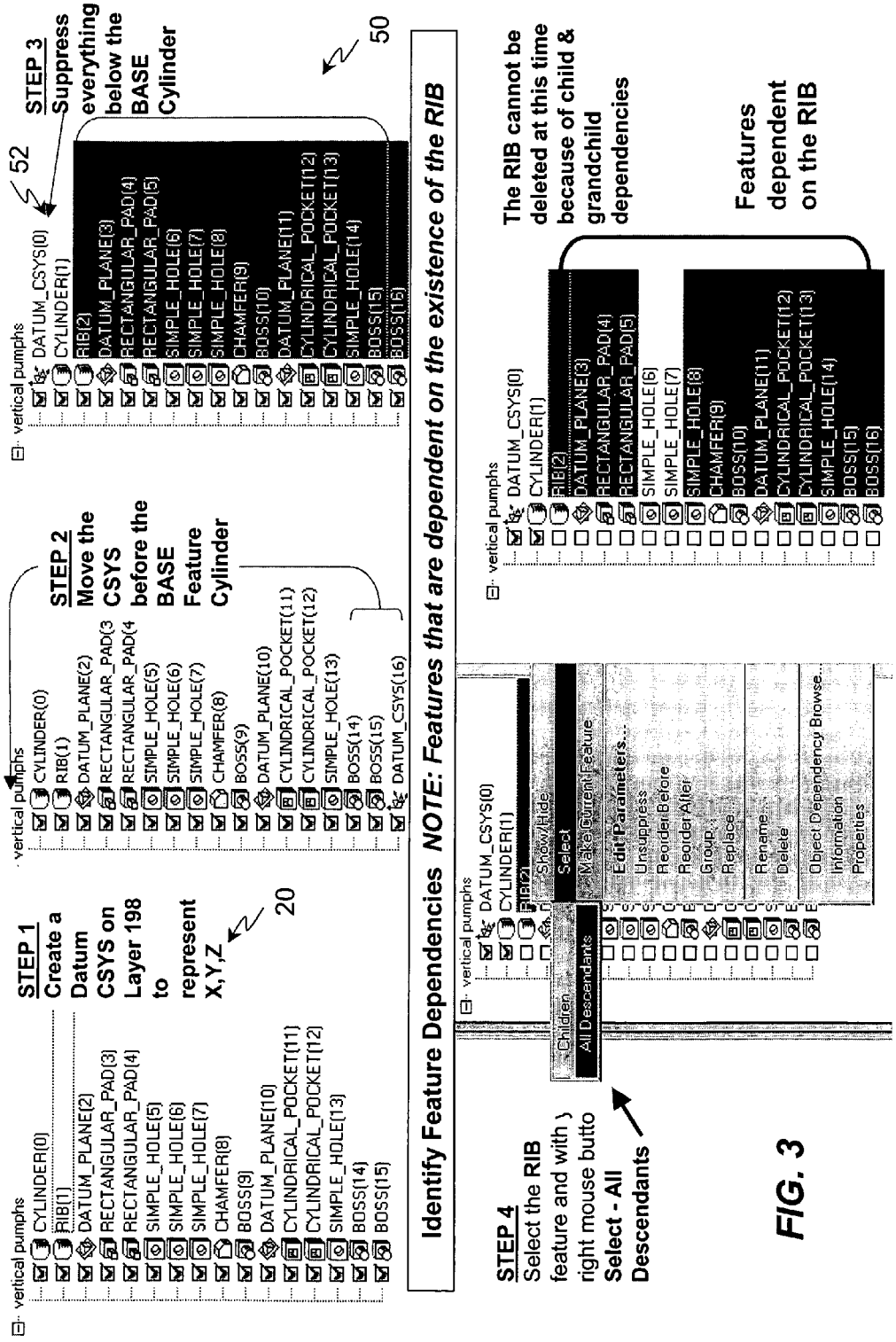
FIG. 3 is an illustration of the conversion methodology and the feature dependencies in the vertical model of FIG. 1.

In an exemplary embodiment, the various dependencies of the modeling elements 13 of the existing model 10 are identified as depicted in the process at block 202. In addition, a base feature 12 is identified (or established if necessary) to initiate the conversion as depicted at process block 204. One method to identify dependencies is by employing the Unigraphics® Model Navigator 10; Object Dependency Browser function 52, Select All Descendents sub-function 52 (or their equivalents in other modeling software packages). FIG. 3, also provides an illustration of the various dependencies for the existing model 10 as well as the menus and submenus of the Unigraphics® Model Navigator 50. The base feature 12 may readily be identified as the cylinder(0).

It will be appreciated that as used herein references to various elements of he model 10 are followed by a numeral indicating an order in the model 10. This order is illustrative of a feature of Unigraphics® and not intended to indicate any particular hierarchy or dependency beyond the order in the model. It will be further appreciated that as referenced herein the numerals associated with particular modeling elements, e.g., features 14, datums 18 and the like will vary as the order of that element changes with the conversion.

Continuing once again with FIGS. 1-3, and the conversion methodology 200 of an exemplary embodiment, to initiate the conversion, at process block 206 the existing model 10 is modified to include a new parent coordinate system 20 a reference feature. This new parent coordinate system 20 and its descendants e.g., other coordinate systems 20 and datums 18) are used to control the positioning and placement of the modeling features 14. In an exemplary embodiment, the coordinate system 20 is depicted as comprising three orthogonal datum planes 18 located at the modeling environment work coordinate system origin. However, it will be appreciated that other configurations for a coordinate system 20 are possible. For example, single planes, lines, as well combinations including at least one of the foregoing. Furthermore, it will be appreciated that while it is preferred that the added coordinate system 20 is placed in the model under conversion preceding the base feature 12, other arrangements are also possible, for example the new parent coordinate system 20 could be configured to be subsequent to the base feature 12. FIG. 3 also depicts an illustration of the addition of the new parent coordinate system 20 denoted as DATUM_CSYS(0) preferably, but not necessarily at the "top" of the model 10.

Turning now to FIG. 4, in an exemplary embodiment, an additional plane, or set of planes 18 is optionally established relative to the parent coordinate system 20 as depicted at process 207 to facilitate positioning and placement of the modeling features 14. In an exemplary embodiment, the planes 10 are established in the same planes e.g., X, Y, and Z as the planes of the parent coordinate system 20 with offsets, shifting, rotations and the like as well as combinations of the foregoing as needed to facilitate positioning and placement of the modeling features 14.

Figure 5:
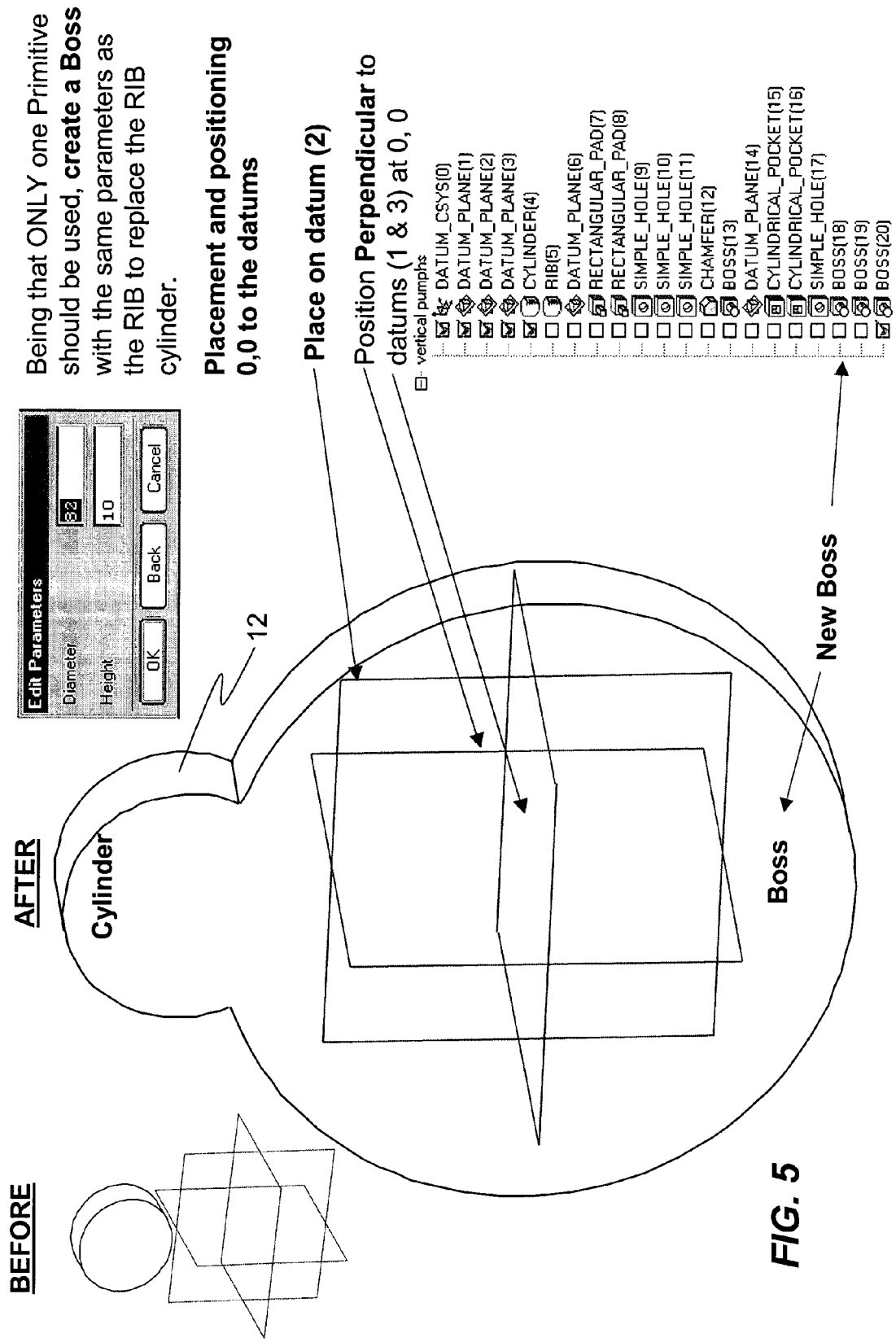
FIG. 5 is an illustration of the conversion methodology applied to the vertical model of FIG. 1 showing conversion of a second primitive modeling element.
Figure 6:
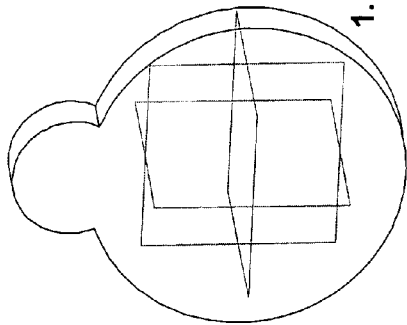
FIG. 6 is an illustration of the conversion methodology applied to the vertical model of FIG. 1 showing observation of feature dependencies.

Turning now to FIGS. 5 and 6 as well, the existing model 10 is evaluated to ensure that no other feature of the existing model 10 is configured as a base feature 12 (e.g., a primitive). If others exist, these elements are reconfigured as modeling features 14 to facilitate the conversion as depicted at decision and process blocks 208 and 210 and converted with the modeling features 14 as described below. In an exemplary embodiment, the reconfiguring includes generating a new form feature 14 with the same parameters as the "extra" base feature placed and positioned relative to the datums of the parent coordinate system 20 or another coordinate system 20 related to parent coordinate system 20. The illustration in FIG. 4 depicts the CYLINDER(1) as a base feature or primitive (a cylinder in the example). The illustration of FIG. 5 depicts the base feature 12 as well as the newly added feature 14, shown in the figures as BOSS(20), which is then re-ordered to precede the RIB(5) as depicted in FIG. 6. FIG. 6 depicts the "new" form feature as BOSS(5) "replacing" the RIB. However, it should be noted that the RIB(6) may not be deleted because of the feature dependencies that may be associated with it.

Turning now to process block 212, the methodology 200 continues with the identification of a first "parent" modeling element 13*a* (and its descendants). In addition, optionally, all descendants of this first parent modeling element 13*a* may be suppressed (hidden) to clarify the working environment of the model 10 and avoid confusion as depicted at process block 211. Note that the first parent modeling element 13*a* will most likely correspond to the replaced "multiple" base feature for which a modeling feature 14 is established as discussed for process block 208 and 210, if such a modeling feature 14 was established. It should also be noted that the first parent modeling element 13*a* may but need not be a modeling feature 14. The first parent modeling element 13*a* could also be another base feature 12, primitive, modeling feature and the like. FIG. 6 depicts the RIB(6) in the Feature Dependency Table as the first parent modeling element 13 as well as all of its feature dependencies.

The methodology 200 continues for the restructuring of each feature with process 214 as depicted on FIG. 2B of the existing model 10 to form the new horizontally structured model. The methodology 200 continues as depicted at process block 215, with the identification of the various feature dependencies associated with the first parent modeling element 13*a* from process 212. At decision block 216, it is determined for each modeling element 13 dependent from the first parent modeling element 13*a*, whether datums 18 are established in the existing model 10 governing the placement of a particular modeling element 13 or modeling feature 14. If not, the methodology 200 optionally includes establishing a new datum or datums 18 or coordinate system 20 dependent from the parent coordinate system 20, preferably, but not necessarily ordered just after the parent coordinate system 20 to govern the placement of this modeling feature 14 as depicted at process block 218. If a datum 18 was employed for placement in the existing model 10, the datum 18 may alternatively be reordered and attached to the parent coordinate system 20 and re-utilized to control the placement of the form feature as depicted at process block 220. Alternatively, the modeling feature 14 may employ a datum of the parent coordinate system 20 for placement as would be employed for horizontally structured modeling.

Figure 8:
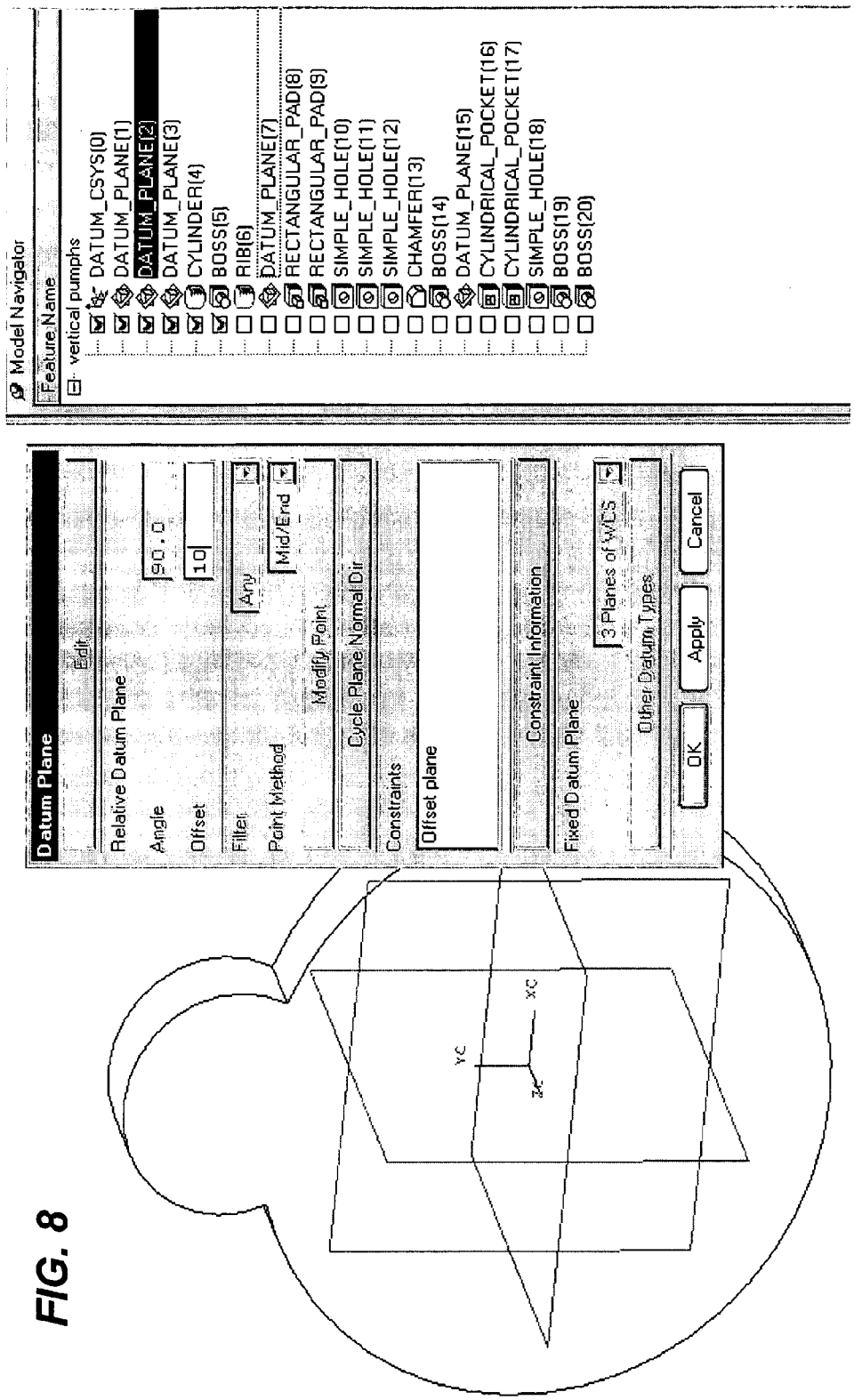
FIG. 8 is an illustration of the conversion methodology applied to the vertical model of FIG. 1 showing re-attachment of an existing datum plane for feature placement.
Figure 11:
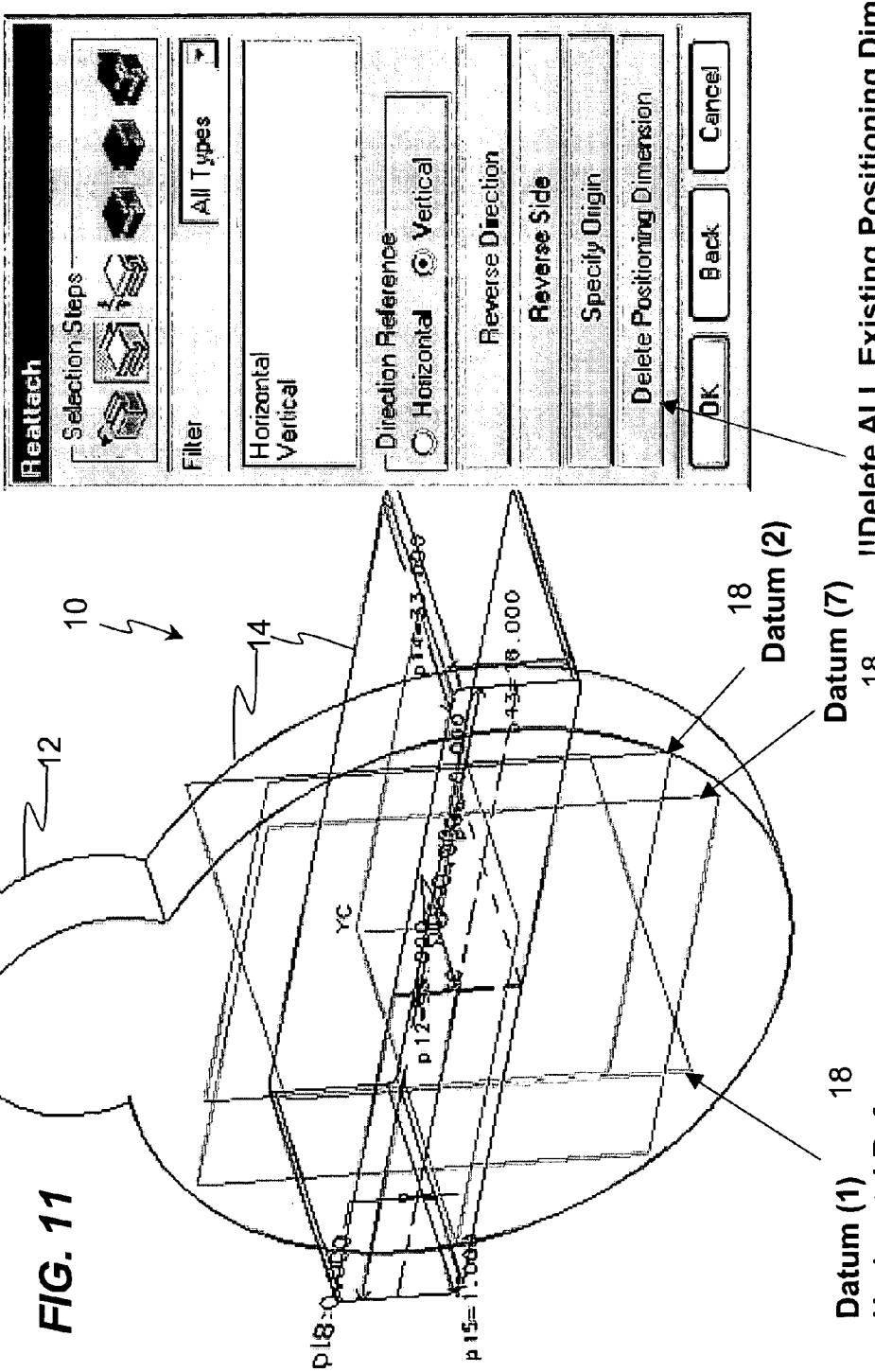
FIG. 11 is an illustration of the conversion methodology applied to the vertical model of FIG. 1 showing placement of another feature to a datum plane, e.g., RECTANGULAR_PAD(8)

FIGS. 7-12 depict an illustration where the existing model 10 includes a DATUM_PLANE(7) used for one of placement or positioning of a modeling feature 14, RECTANGULAR_PAD(8). As is illustrated in the figures, the Object Dependency Browser indicates DATUM_PLANE(7) has parent of Face—of RIB(6), therefore, DATUM_PLANE(7) is used for the placement of RECTANGULAR_PAD(8) (and RECTANGULAR_PAD(9)). FIGS. 8 and 9 depict the considerations for RECTANGULAR_PAD(8) and RECTANGULAR_PAD (9) which were originally created on DATUM_PLANE(7) and positioned with RIB(6). In this example, DATUM_PLANE(7) is reestablished for the placement with offset from the coordinate system 20 or the additional coordinate system 20 from process 207, In this example DATUM_PLANE(7) is offset from DATUM_PLANE(2) in the X-Y plane by the thickness of the original RIB(6) to facilitate the placement of the RECTANGULAR_PAD(8) in the same plane as the face of the RIB(6) as depicted in FIGS. 9 and 10. FIG. 11 depicts the re-attachment of RECTANGULAR_PAD(8) to the newly offset DATUM_PLANE(7).

Returning to FIG. 2B and the methodology 200 and continuing the restructuring of the features 214, following the attachment of a modeling feature 14 to the datum plane 18 as described above for process block 220, the existing positioning relationships are deleted as depicted at process block 222. At decision block 224, it is determined whether for this modeling feature 14, datum(s) 18 are established in the existing model 10 governing the positioning of the modeling feature 14. If not, once again, the methodology 200 optionally includes establishing new datum(s) 18 or coordinate system 20 dependent from the parent coordinate system, preferably, but not necessarily ordered just after the parent coordinate system to govern the positioning of this modeling feature 14 as depicted at process block 226. If datum(s) 18 were employed for positioning in the existing model 10, then the datums 18 may be attached to the parent coordinate system 20 and re-utilized to control the positioning of the form feature as depicted at process block 228. Alternatively, as with placement, the modeling feature 14 may employ datum(s) 18 of the parent coordinate system 20 for positioning as would be employed for horizontally structured modeling. Once again, turning to the illustration provided in FIGS. 10 and 11, the existing datum plane 18 denoted DATUM_PLANE(7) was re-utilized and offset as described above to facilitate the placement of the RECTANGULAR_PAD(8) (as well as RECTANGULAR_PAD(9)) the deletion of the existing positioning dimensions for the RECTANGULAR_PAD(8) (and (9)) is shown in FIG. 11. Turning now to FIG. 12, new positioning dimensions are established based on the DATUM_PLANE(1) and DATUM_PLANE(3). FIG. 12 also depicts before and after views of the Object Dependency Browser for the RECTANGULAR_PAD(8) indicating dependencies only to the DATUM_PLANE(3) and DATUM_PLANE(1) for positioning and DATUM_PLANE(7) for placement as indications of the structure of a horizontally structured model as opposed to DATUM_PLANE(7) for placement and the RIB (6) for positioning in the "before" view.

Figure 13:
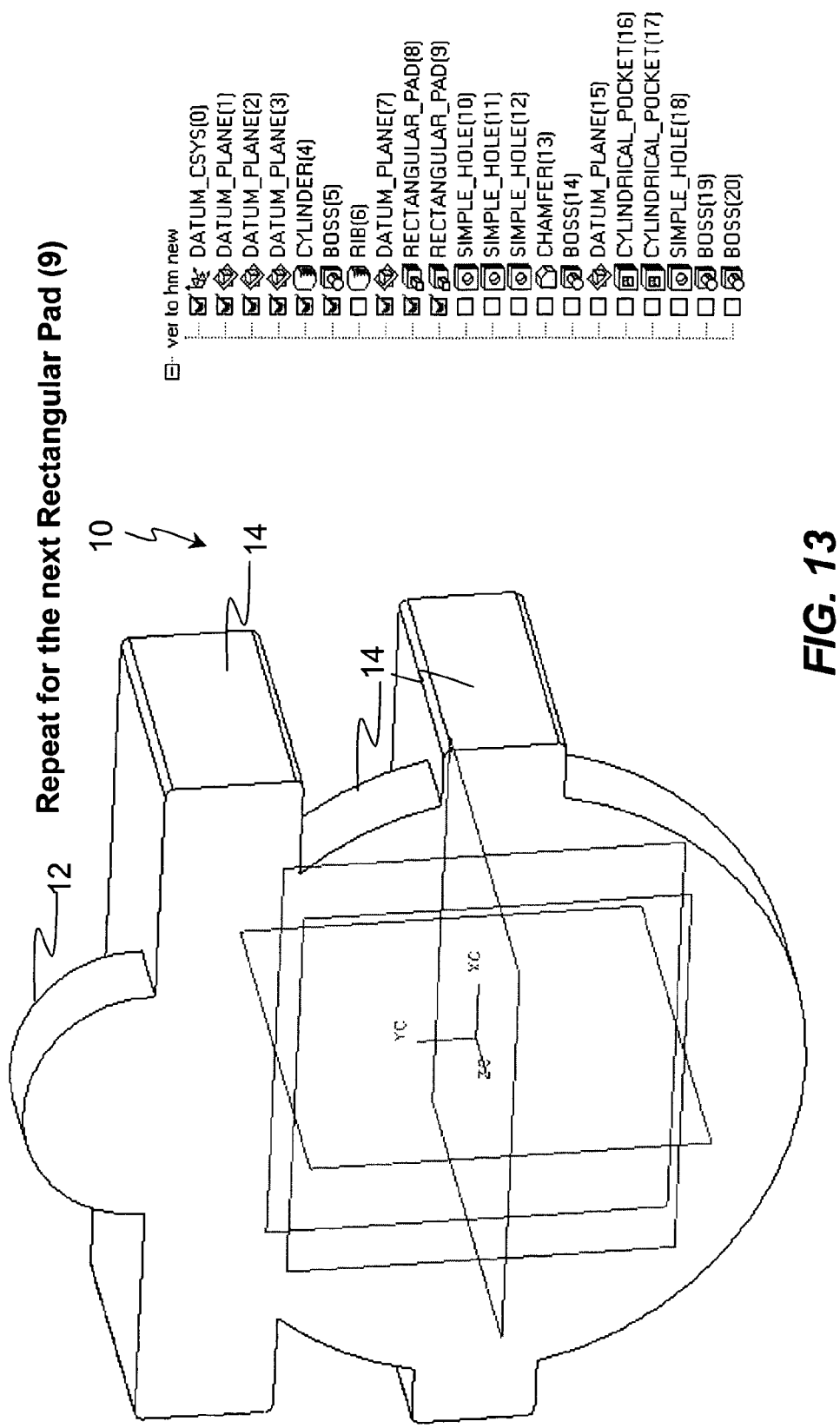
FIG. 13 is an illustration of the conversion methodology applied to the vertical model of FIG. 1 showing reordering of modifying features, e.g., RECTANGULAR_PAD(9)

Continuing with the methodology 200 and continuing the restructuring of the features 214, following the positioning of a modeling feature 14, the next modeling feature 14 dependent from the parent modeling element 13a established in process 212 is un-suppressed, if necessary, as depicted at process block 230. Process block 231 indicates that the restructuring of the features 214 is reiterated for each modeling feature 14 dependent from the selected parent modeling element 13a established in process 212 of the existing model 10 until each modeling feature 14 is re-associated with datum planes 18 or coordinate systems 20 only as described above. FIG. 13 depicts repeating process 214 for RECTANGULAR_PAD(9).

Figure 15:
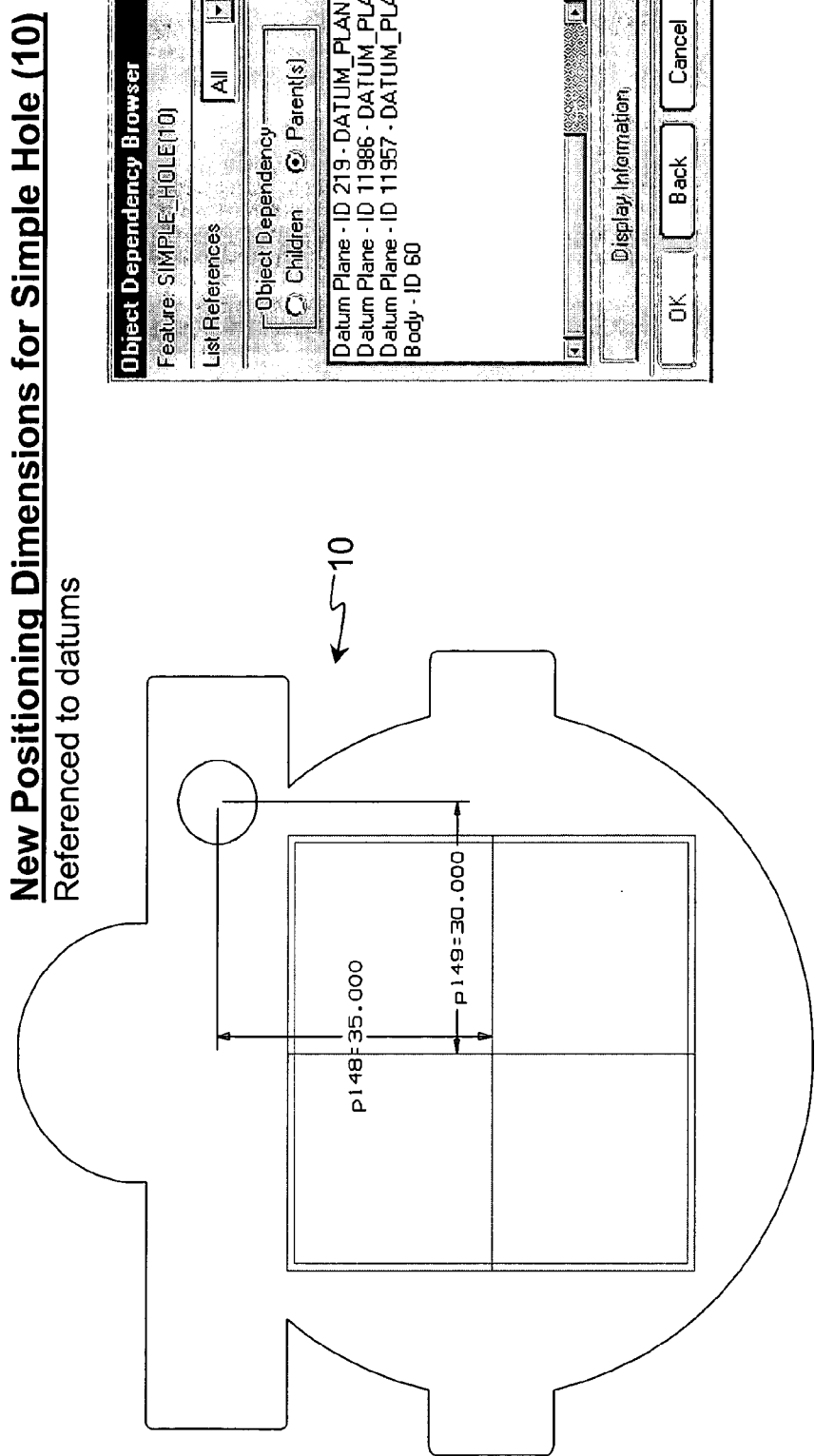
FIG. 15 depicts the repositioning of a modeling feature e.g., SIMPLE_HOLE(10)
Figure 17:
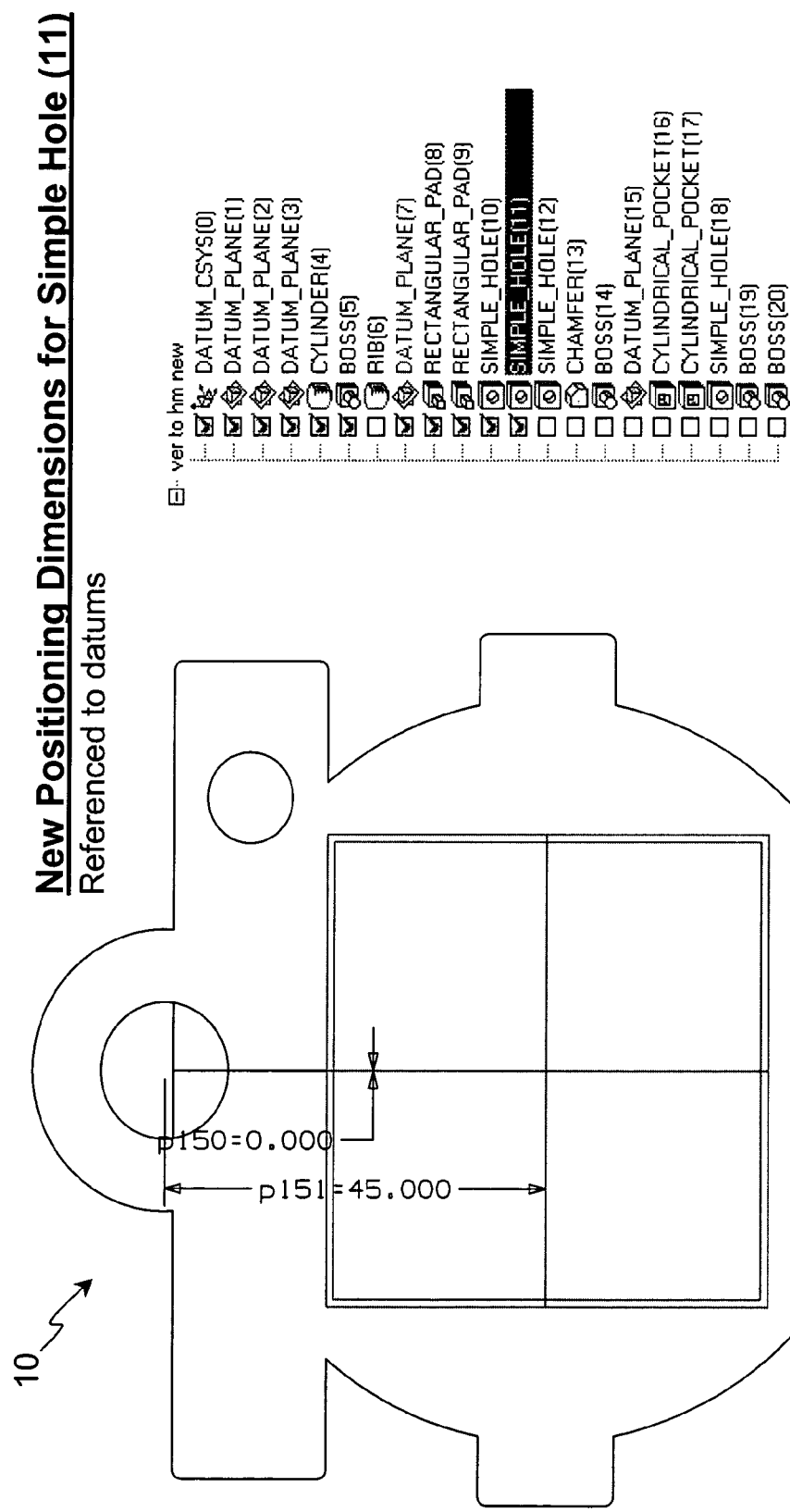
FIG. 17 depicts the repositioning of a modeling feature e.g., SIMPLE_HOLE(11)
Figure 18:
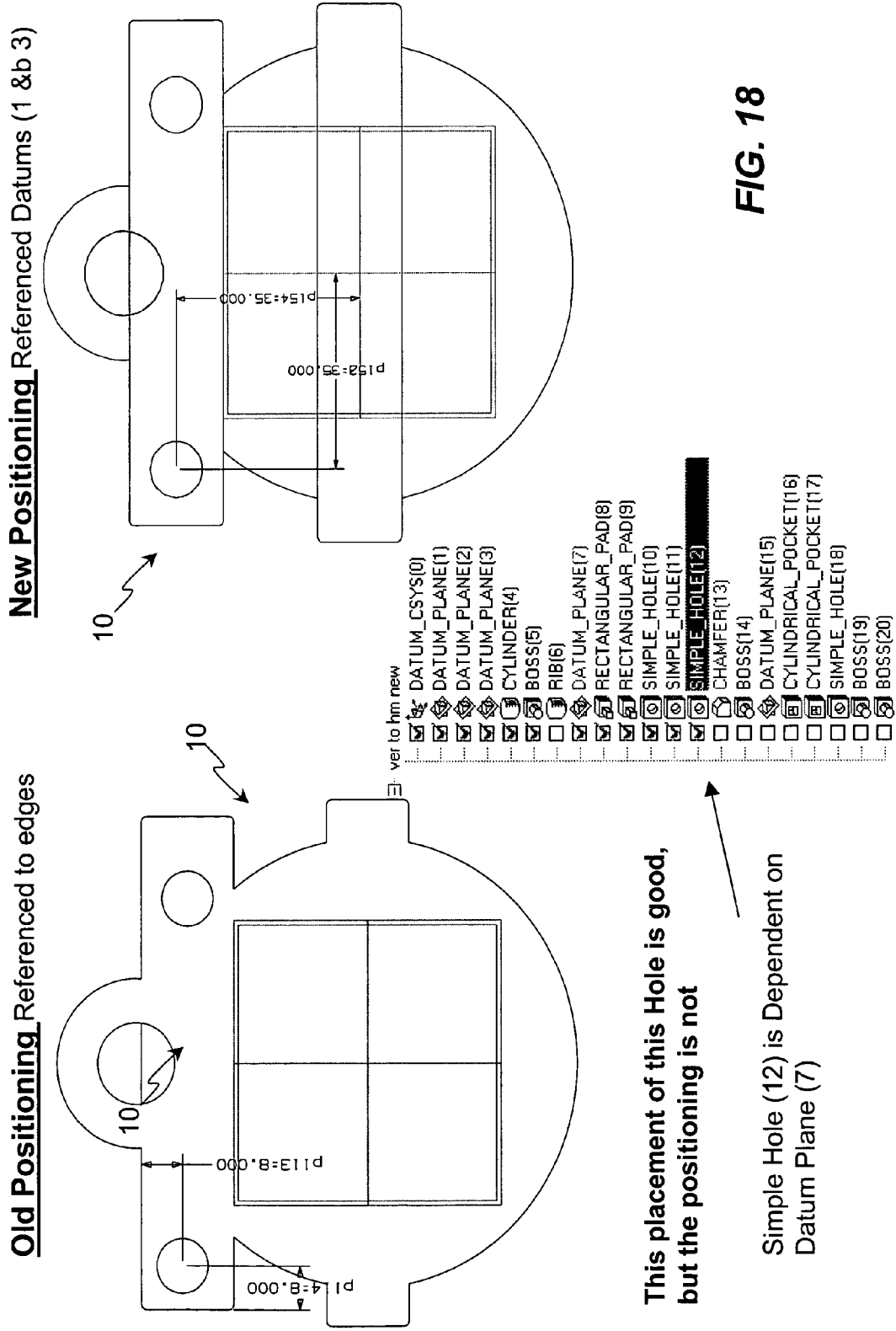
FIG. 18 depicts a comparison of the positioning of a modeling feature.

Turning to FIGS. 14 and 15, the illustration depicts the restructuring of modeling feature 14, SIMPLE_HOLE(10). In this instance, FIG. 14 depicts the existing placement relative to CYLINDER(4) and positioning relative to the edges of another feature, RECTANGULAR_PAD(9) When restructured, the placement is to a datum 18, once again in this instance DATUM_PLANE(7), while positioning is relative to the X and Y planes e.g., DATUM_PLANE(1) and DATUM_PLANE(3) of the coordinate system 20. Once again, the process is repeated for the other modeling features 14, in this instance, SIMPLE_HOLE(11) and SIMPLE_HOLE(12) as depicted in FIGS. 16-18.

Figure 19:
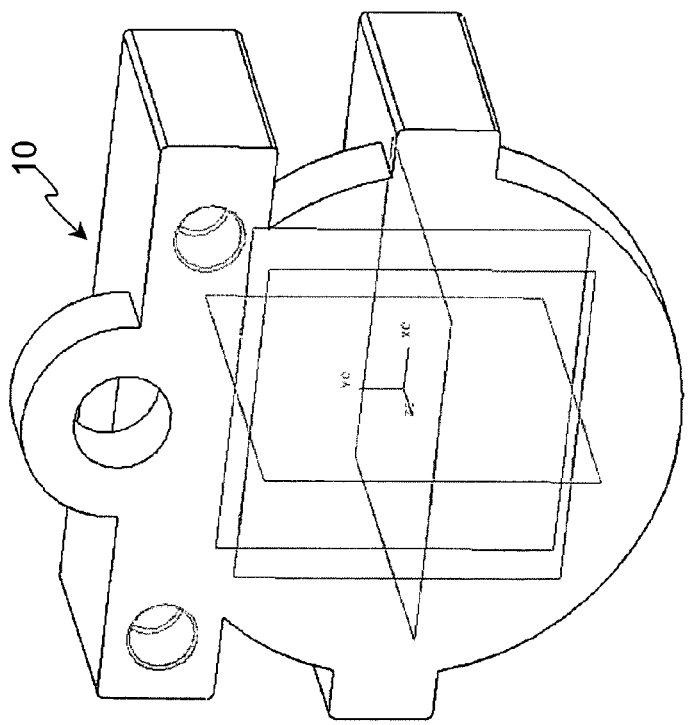
FIG. 19 depicts the evaluation of feature dependencies and re-ordering of a modifying feature.
Figure 20:
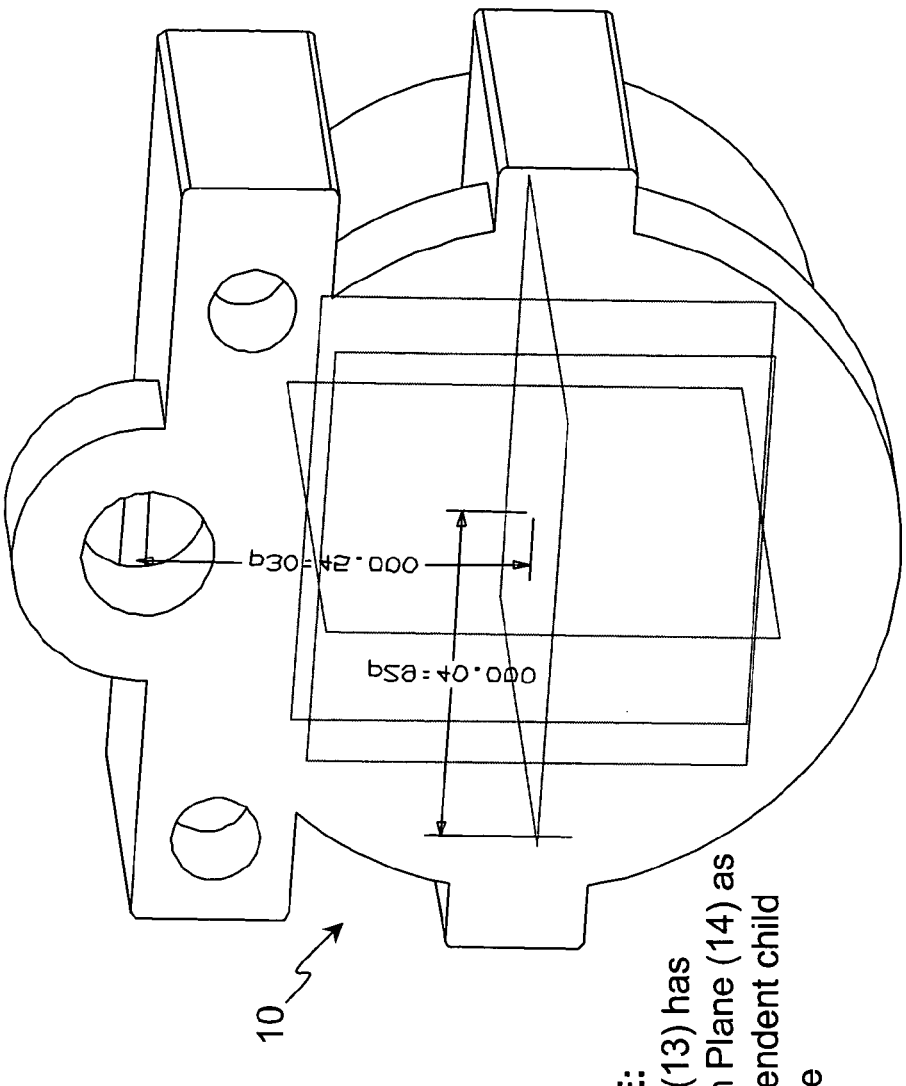
FIG. 20 depicts the re-attachment of a modeling elements 14 e.g., BOSS(13)

In accordance with the hierarchy described above, modifying features 16 are preferably treated separately, as they are always tied to a particular modeling feature 14. Therefore, for convenience, and as a matter of good practice, modifying features 16 are preferably re-ordered to the end of the features dependency list for convenience. Referring now the illustration in FIG. 19, the CHAMFER(13) is preferably reordered to the end of the features as depicted becoming CHAMFER(20). Likewise, referring now to FIGS. 20-32, the restructuring of the model 10 for modeling elements BOSS(13), DATUM(14), CYLINDRICAL_POCKET(15), CYLINDRICAL_POCKET(16), SIMPLE_HOLE(17), BOSS(18), BOSS(19) respectively. FIG. 20 depicts the re-attachment of modeling element 14, BOSS(13. FIG. 21 depicts the evaluation and deletion of DATUM(14) as it is no longer needed. FIGS. 22 and 23 depict the repositioning of CYLINDRICAL_POCKET(15). In the existing model, this modeling feature 14 was placed relative to DATUM_PLANE(7) and once restructured, it is positioned relative to DATUM_PLANE(1) and DATUM_PLANE(3).

Figure 24:
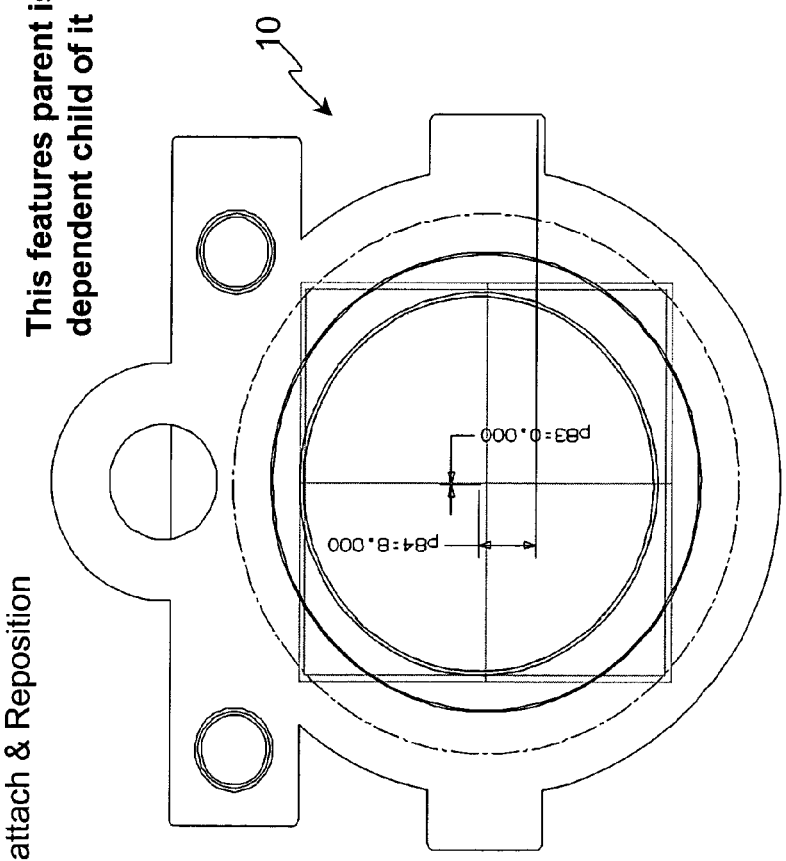
FIG. 24 depicts the feature dependencies of a modeling feature, e.g., CYLINDRICAL_POCKET(16)
Figure 26:
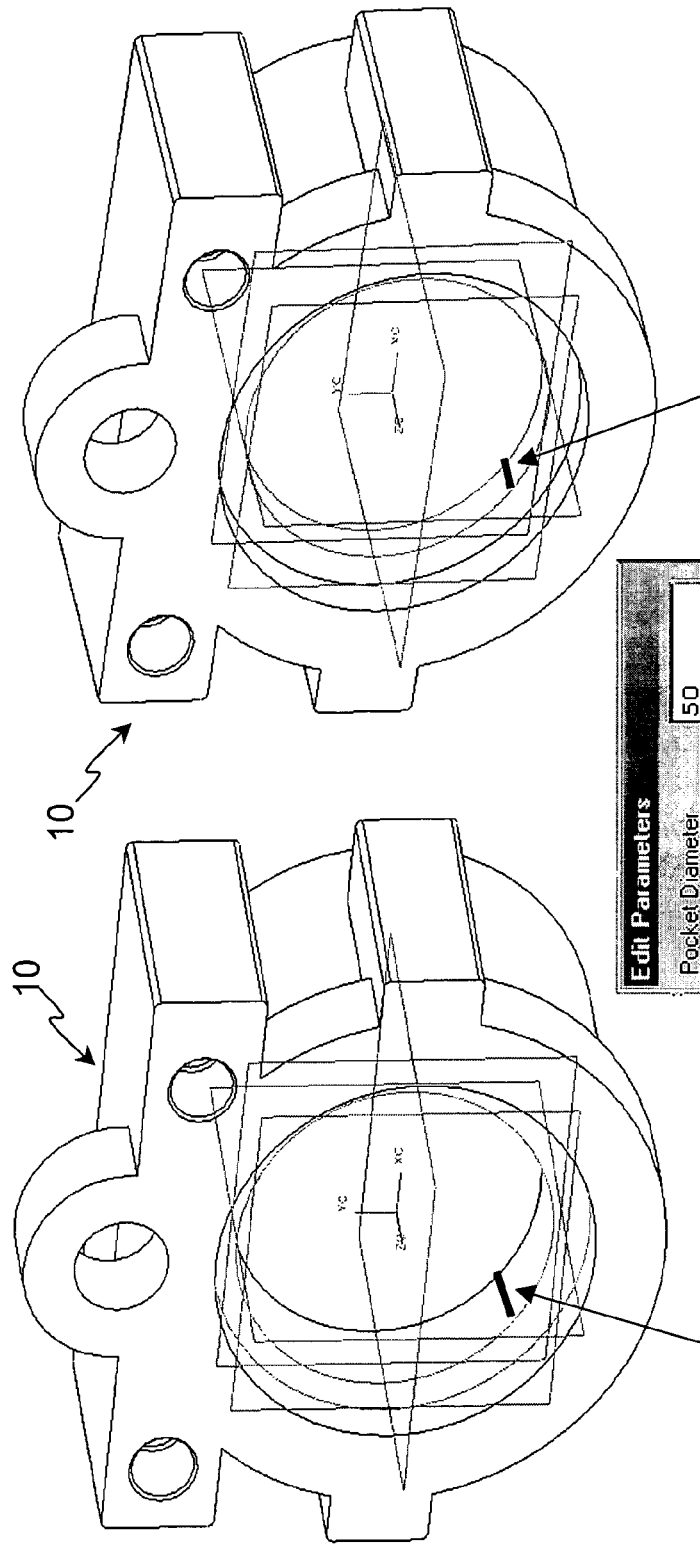
FIG. 26 depicts the repositioning of a modeling feature, e.g., CYLINDRICAL_POCKET(16)
Figure 27:
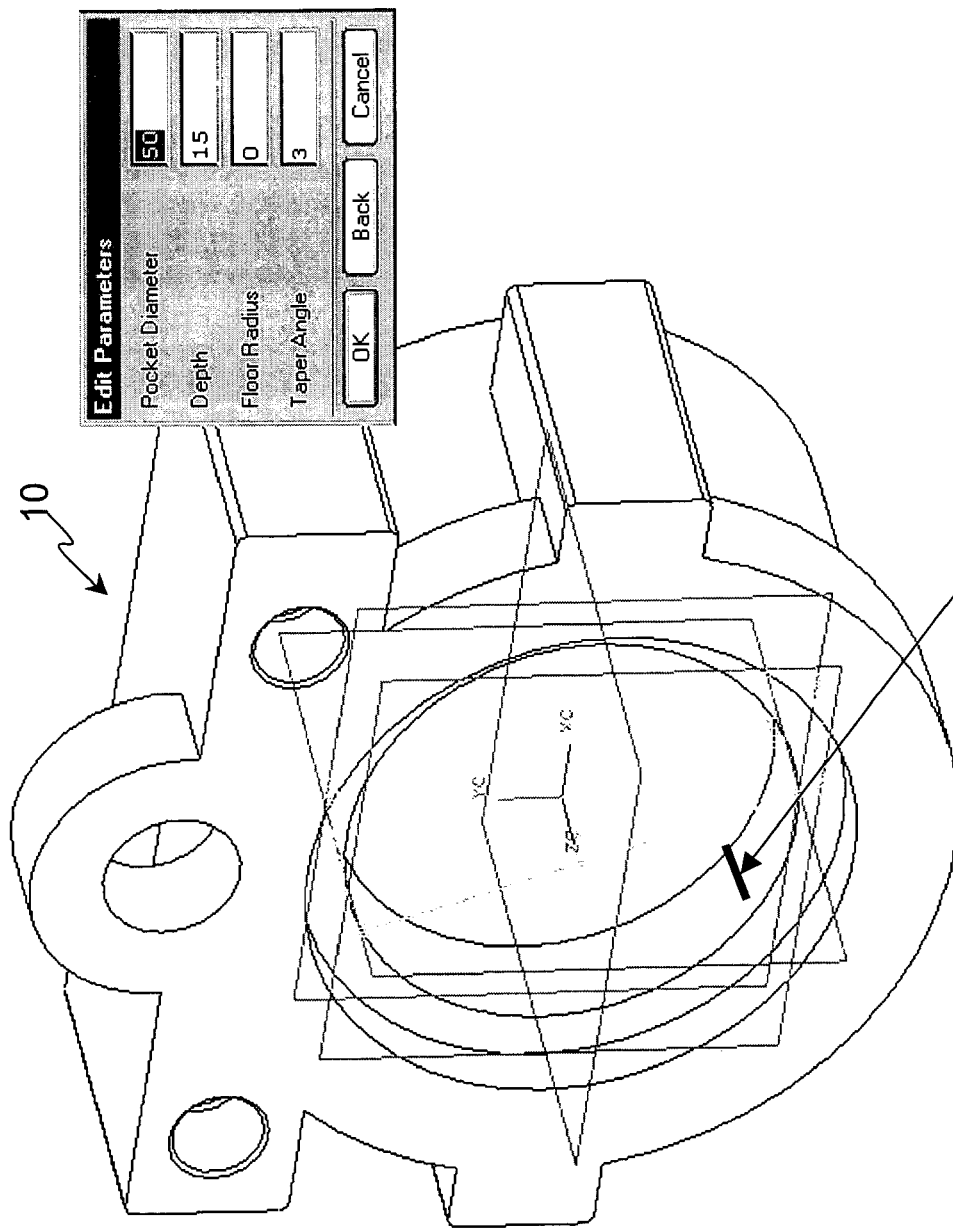
FIG. 27 depicts the existing and new depths for a modeling feature, e.g., CYLINDRICAL_POCKET(16)

FIG. 24-27 depict the restructuring for CYLINDRICAL_POCKET(16). FIG. 24 depicts that this modeling feature exhibits dependency to CYLINDRICAL_POCKET(15) and is a parent of SIMPLE_HOLE(17). Modeling feature 14, CYLINDRICAL_POCKET(16) is restructured by reattaching to a datum plane 18 and repositioning. In the example, FIG. 25 depicts that CYLINDRICAL_POCKET(16) is placed relative to DATUM_PLANE(7), however, this placement will also require an adjustment to compensate the specified depth. Alternatively, it will be appreciated that another datum plane 18 with an appropriate offset could have been established, which would not have required a modification to the specified depth. FIGS. 26 and 27 depict the existing and new depths for CYLINDRICAL_POCKET(16).

Figure 28:
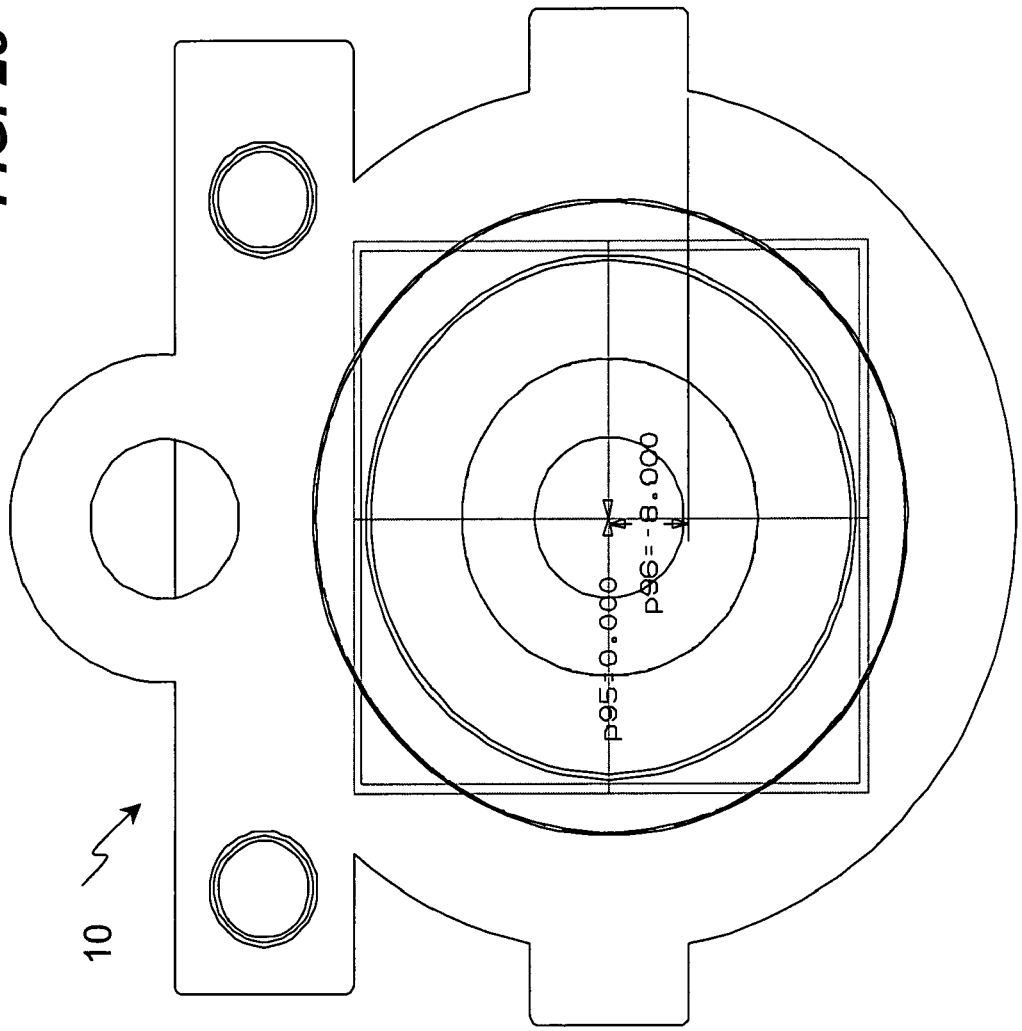
FIG. 28 depicts the feature dependencies of a modeling feature, e.g., SIMPLE_HOLE(17)
Figure 29:
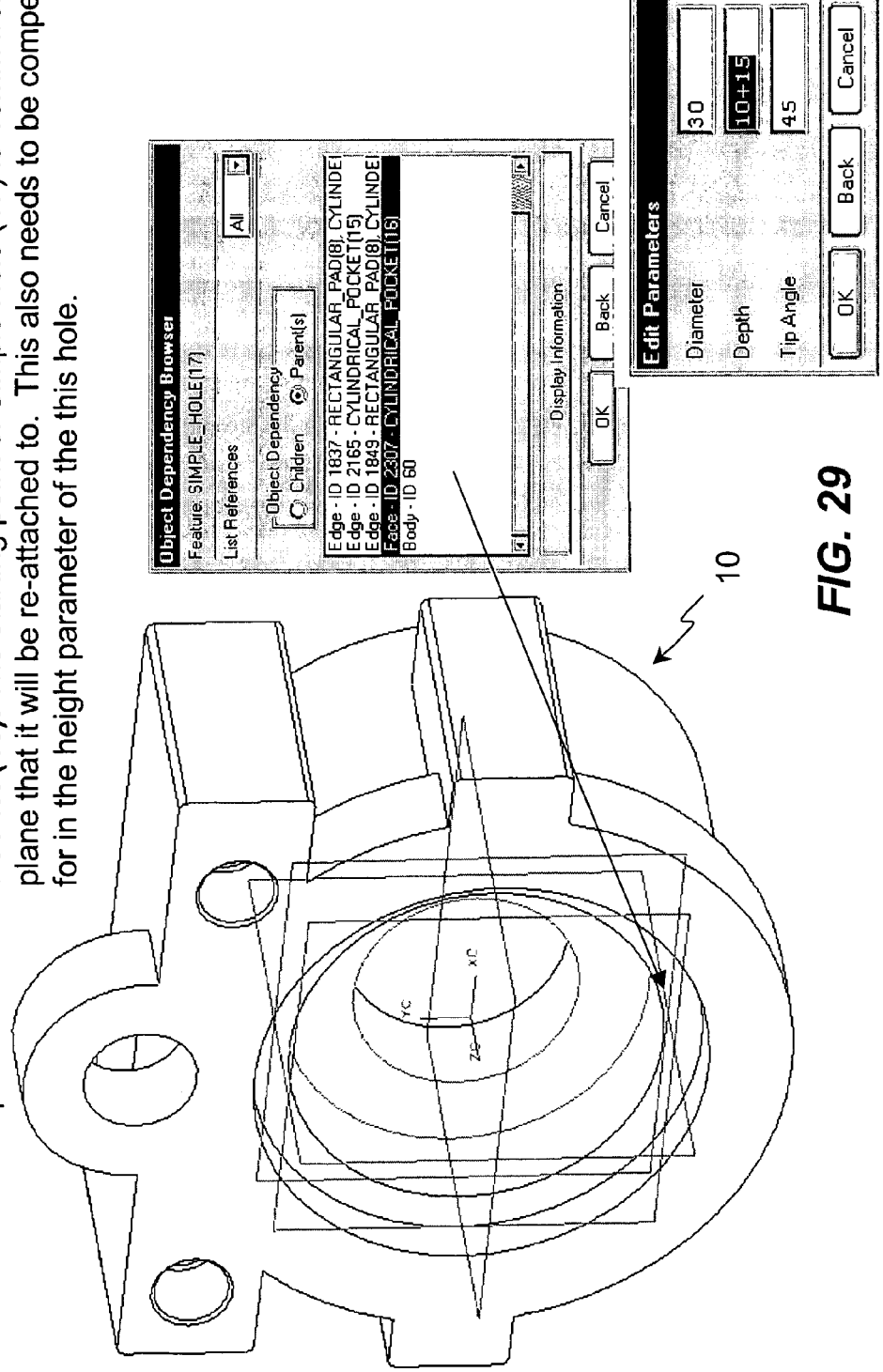
FIG. 29 depicts the feature dependencies and repositioning of a modeling feature, e.g., SIMPLE_HOLE(17)
Figure 30:
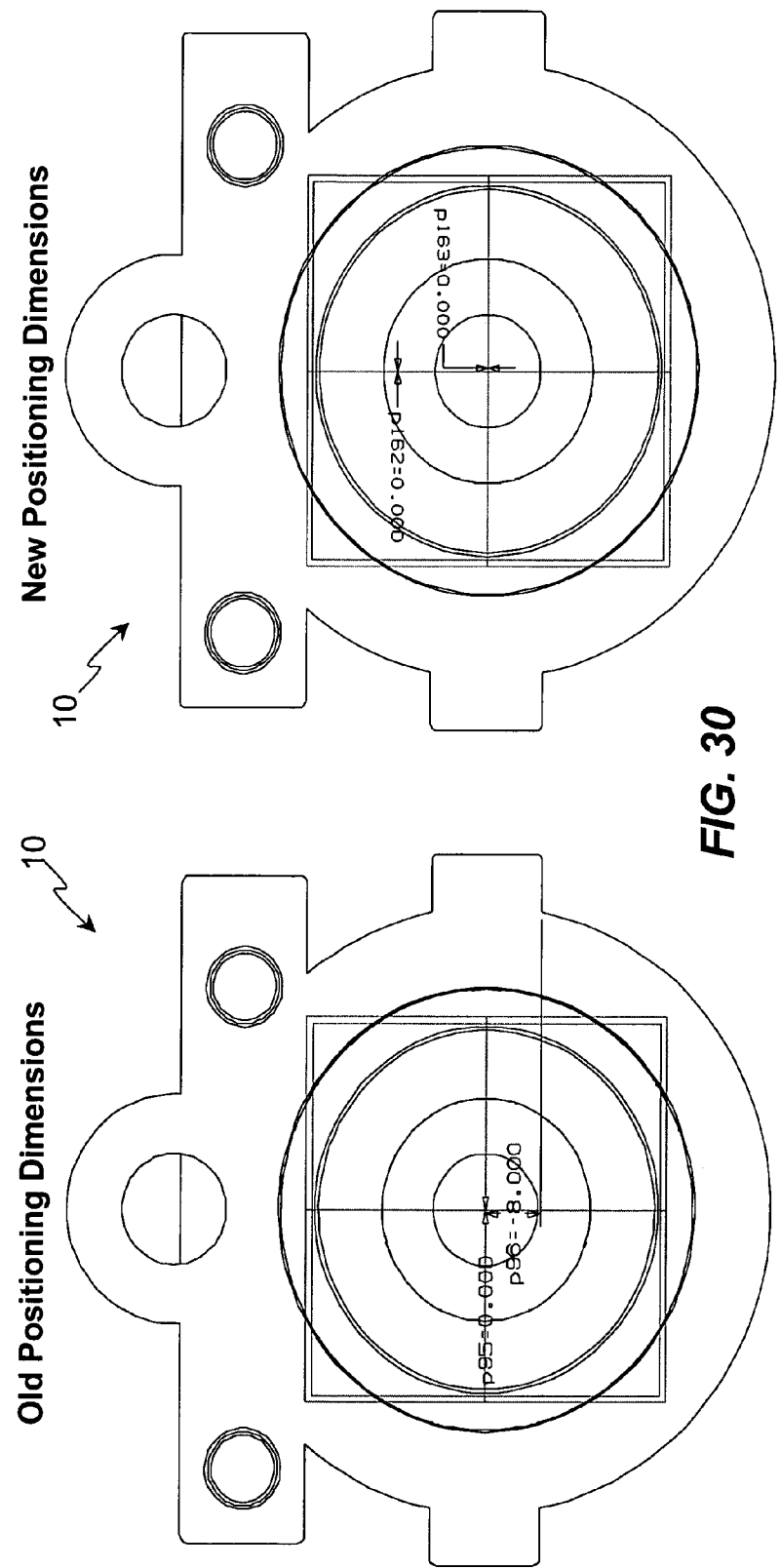
FIG. 30 depicts the repositioning of a modeling feature, e.g., SIMPLE_HOLE(17)
Figure 31:
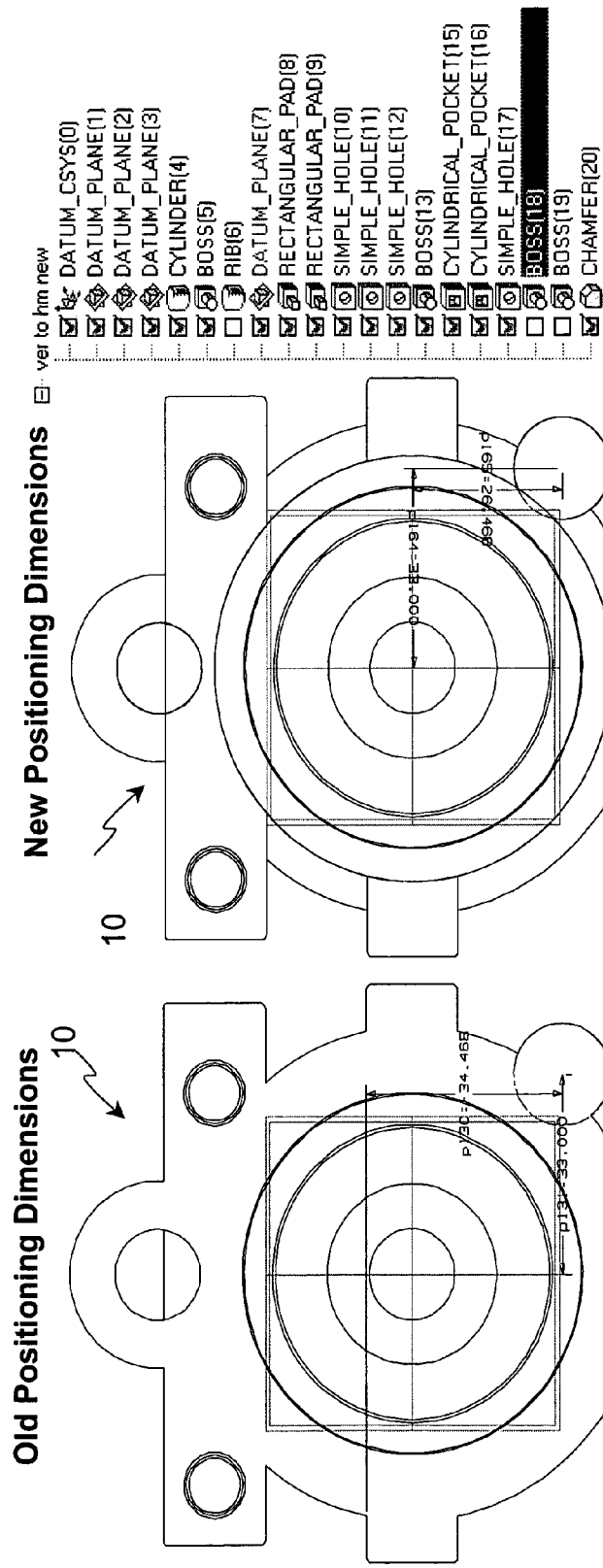
FIG. 31 depicts the repositioning of a modeling feature, e.g., BOSS(18)

Continuing with FIGS. 28 and 29, the modeling feature 14, SIMPLE_HOLE(17) is shown as a child of CYLINDRICAL_POCKET(16), and is restructured to eliminate the dependency. SIMPLE_HOLE(17) is attached DATUM_PLANE(7), and the depth of the hole is recalculated based on the new placement. FIGS. 29 and 30 depict the repositioning of modeling feature 14, SIMPLE_HOLE(17). Turning now to FIG. 31, BOSS(18) is repositioned relative to DATUM_PLANE(1) and DATUM_PLANE(3). As this modeling element was already placed relative to DATUM_PLANE(7), no modification for placement is necessary. Similarly with respect to modeling feature 14, BOSS(19), FIG. 32 depicts the repositioning.

Returning now to FIG. 2 and the methodology 200, in an exemplary embodiment, the once each modeling feature 14 dependent from the first parent modeling feature 13a has been restructured, the methodology continues as depicted at process block 232 by determining if there is another "parent" modeling element 13b with dependencies. If so, the restructuring 214 continues for any modeling features 14 dependent from the next parent modeling element 13b and so on.

Furthermore, once all the other modeling features 14 have been restructured, any modeling elements no longer utilized may be deleted as depicted at process block 234. For example, in the illustration of FIG. 33, RIB(6) should now exhibit no dependencies and is deleted. Furthermore, with the deletion of the unused RIB(6), DATUM_PLANE(7), now DATUM_PLANE(6) is reordered above the other features.

Finally to evaluate the structure of the now horizontally structured model, observation of the feature dependencies is highly instructive. Turning to FIG. 34, it becomes apparent that for each modeling feature 14 in the model, placement and positioning is controlled by a coordinate system 20 and datum planes 18 independent of the base feature 12 (now CYLINDER(4) or any other feature. In this manner, the modeling features 14 may be individually treated, replaced, modified, deleted, and the like without any impact on the other features of the model. It will be appreciated that modifying features 16 because of their specific relationship to other modeling features 14 are still linked to other modeling features 14. FIG. 34 depicts a final check of the feature dependencies of the restructured model to ensure the horizontal structure of the feature dependencies.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for converting a vertically structured CAD/CAM model to a horizontally structured CAD/CAM model, comprising:

identifying a base modeling element of the vertically structured CAD/CAM model and establishing it as a base feature of the vertically structured CAD/CAM model;

establishing a parent coordinate system for the horizontally structured CAD/CAM model;

identifying a parent modeling element of the vertically structured CAD/CAM model, the parent modeling element including a plurality of modeling features dependent thereof;

identifying each dependency for each of a plurality of modeling features from said parent modeling element; and converting an existing vertically structured CAD/CAM model to a horizontally structured CAD/CAM model by:

restructuring each dependency for each said modeling feature for placement with respect to the horizontally structured CAD/CAM model, such that each said modeling feature exhibits a direct associative relationship with a reference feature, said restructuring including;

determining if said modeling feature is dependent on an existing datum plane for placement;

for modeling features determined to be dependent on an existing datum plane for placement, performing at least one of:

configuring a new reference feature for placement of said modeling feature wherein said new reference feature is dependent on said parent coordinate system and establishing an associative relationship between said modeling feature and said new reference feature, then deleting the dependency between the modeling feature and the existing datum plane, reconfiguring said existing datum plane as a descendant of said parent coordinate system, and establishing an associative relationship with at least one of said parent coordinate system and a reference feature dependent therefrom and deleting the dependency between the modeling feature and the existing datum plane.

2. The method of claim 1 wherein said reference feature includes one of:

said parent coordinate system, a child coordinate system exhibiting an associative relationship with said parent coordinate system, a first datum plane exhibiting an associative relationship with at least one of said parent coordinate system and said child coordinate system, and a second datum plane exhibiting an associative relationship with said first datum plane.

3. The method of claim 1 further including identifying a primitive in said vertically structured CAD/CAM model.

4. The method of claim 3 further including converting said primitive to a modeling feature.

5. The method of claim 4 wherein said converting said primitive includes establishing a new feature corresponding to said primitive such that said new feature exhibits an associative relationship with at least one of said parent coordinate system and a child thereof for placement.

6. The method of claim 5 wherein said associative relationship between the new feature and the at least one of the parent coordinate system and a child thereof is a parent/child relationship.

7. The method of claim 1 wherein said base feature corresponds to a selected primitive element in said vertically structured CAD/CAM model.

8. The method of claim 1 wherein said modeling feature dependent from said parent modeling element exhibits a parent child relationship with at least one of said parent modeling element and a descendent thereof such that placement of said dependent modeling features is relative to said at least one of said parent modeling element and said descendent thereof.

9. The method of claim 1 wherein none of said modeling features exhibits an associative relationship with any other modeling feature.

10. The method of claim 1 wherein none of said modeling features exhibits an associative relationship with said base feature.

11. The method of claim 1 wherein said base feature exhibits an associative relationship with at least one of said parent coordinate system and a descendent thereof.

12. The method of claim 1 wherein a descendent of said parent coordinate system includes at least one of a reference, point, line, datum plane and another coordinate system positioned and oriented relative to said parent coordinate system.

13. A system for converting a vertically structured CAD/CAM model to a horizontally structured CAD/CAM model, comprising:

a computer; and a computer program executing on the computer, the computer program implementing a method, comprising:

identifying a base modeling element of the vertically structured CAD/CAM model and establishing it as a base feature of the vertically structured CAD/CAM model;

establishing a parent coordinate system for the horizontally structured CAD/CAM model;

identifying a parent modeling element of the vertically structured CAD/CAM model, the parent modeling element including a plurality of modeling features dependent therefrom; and identifying each dependency for each of a plurality of modeling features from said parent modeling element;

converting an existing vertically structured CAD/CAM model to a horizontally structured CAD/CAM model by:

restructuring each dependency for each said modeling feature for placement with respect to the horizontally structured CAD/CAM model, such that each said modeling feature exhibits a direct associative relationship with a reference feature, said restructuring including:

determining if said modeling feature is dependent on an existing datum plane for placement;

for modeling features determined to be dependent on an existing datum plane for placement, performing at least one of:

configuring a new reference feature for placement of said modeling feature wherein said new reference feature is dependent on said parent coordinate system and establishing an associative relationship between said modeling feature and said new reference feature, then deleting the dependency between the modeling feature and the existing datum plane, reconfiguring said existing datum as a descendant of said parent coordinate system, and establishing an associative relationship with at least one of said parent coordinate system and a reference feature dependent therefrom and deleting the dependency between the modeling feature and the existing datum plane.

14. The system of claim 13 wherein said reference feature includes one of:
- the parent coordinate system,
- a child coordinate system exhibiting an associative relationship with said parent coordinate system,
- a first datum plane exhibiting an associative relationship with at least one of said parent coordinate system and said child coordinate system, and
- a second datum plane exhibiting an associative relationship with said first datum.

15. The system of claim 13 wherein each associative relationship is a parent/child relationship.

16. The system of claim 13 wherein said modeling feature exhibits an associative relationship with said base feature.

17. The system of claim 13 wherein said base feature exhibits an associative relationship with at least one of said reference feature and a feature dependent thereon.

18. The system of claim 13 further including identifying a primitive in said vertically structured CAD/CAM model.

19. The system of claim 18 further including a new feature established by converting said primitive to a modeling feature corresponding to said primitive such that said new feature exhibits an associative relationship with at least one of said parent coordinate system and a child thereof for placement.

20. The system of claim 13 wherein said base feature corresponds to a selected primitive in said vertically structured CAD/CAM model.

21. The system of claim 13 wherein said reference feature comprises a coordinate system.

22. The system of claim 21 wherein said coordinate system comprises:
- a first datum plane;
- a second datum plane; and
- a third datum plane.

23. The system of claim 22 wherein said first datum plane, said second datum plane, and said third datum plane are orthogonal.

24. The system of claim 13 wherein said reference feature comprises at least one of said parent coordinate system, another coordinate system, a point, line curve, surface, and datum plane.

25. The system of claim 13 wherein none of said modeling features exhibits an associative relationship with any other said modeling feature.

26. The system of claim 13 wherein none of said modeling features exhibits an associative relationship with said base feature.

27. The system of claim 13 wherein a descendent of said parent coordinate system includes at least one of a reference, point, line, datum plane and another coordinate system positioned and oriented relative to said parent coordinate system.

28. A storage medium encoded with a machine-readable computer program code, wherein said storage medium includes instructions for causing a computer to implement a method for converting a vertically structured CAD/CAM model to a horizontally structured CAD/CAM model comprising:
- identifying a base modeling element of the vertically structured CAD/CAM model and establishing it as a base feature of the vertically structured CAD/CAM model;
- establishing a parent coordinate system for the horizontally structured CAD/CAM model;
- identifying a parent modeling element of the vertically structured CAD/CAM model, the parent modeling element including a plurality of modeling features dependent thereof;
- identifying each dependency for each of a plurality of modeling features from said parent modeling element; and
- converting an existing vertically structured CAD/CAM model to a horizontally structured CAD/CAM model by:
- restructuring each dependency for each said modeling feature for placement with respect to the horizontally structured CAD/CAM model, such that each said modeling feature exhibits a direct associative relationship with a reference feature, said restructuring including;
- determining if said modeling feature is dependent on an existing datum plane for placement;
- for modeling features determined to be dependent on an existing datum plane for placement, performing at least one of:
- configuring a new reference feature for placement of said modeling feature wherein said new reference feature is dependent on said parent coordinate system and establishing an associative relationship between said modeling feature and said new reference feature, then deleting the dependency between the modeling feature and the existing datum plane,
- reconfiguring said existing datum plane as a descendant of said parent coordinate system, and
- establishing an associative relationship with at least one of said parent coordinate system and a reference feature dependent therefrom and deleting the dependency between the modeling feature and the existing datum plane.

* * * * *